United States Patent [19]

Rebec et al.

[11] Patent Number: 5,603,102
[45] Date of Patent: Feb. 11, 1997

[54] HOUSING AND PORTABLE INTEGRATED SATELLITE COMMUNICATIONS SYSTEM

[75] Inventors: Mihailo V. Rebec; Mohammed S. Rebec, both of Bristol, Ind.

[73] Assignee: Trans Video Electronics Inc., Bristol, Ind.

[21] Appl. No.: 226,484

[22] Filed: Apr. 12, 1994

Related U.S. Application Data

[63] Continuation-in-part of Ser. No. 85,329, Jul. 2, 1993, which is a continuation-in-part of Ser. No. 47,089, Apr. 16, 1993.

[51] Int. Cl.⁶ .................................................. H04N 7/20
[52] U.S. Cl. ............................ 455/90; 455/89; 455/128
[58] Field of Search .................. 348/6, 18, 723, 348/725, 838, 836; 312/7.1, 7.2, 8.1, 8.2, 8.3, 8.4, 8.5, 8.9, 8.11, 8.14, 8.15, 9.1; 364/708.1; 455/347, 348, 349, 351, 95, 128, 90, 89; 206/305, 349, 521, 521.6, 523, 524, 583, 588, 576, 320, 449; 190/16, 17, 110, 115, 102; 434/224; H04N 7/20, 5/64

[56] References Cited

U.S. PATENT DOCUMENTS

| | | | |
|---|---|---|---|
| 1,484,833 | 2/1924 | Kieffer et al. | 312/8.15 |
| 2,557,244 | 6/1951 | Zelou | 312/7.1 |
| 2,777,902 | 1/1957 | Goldmack | 312/7.1 |
| 3,012,835 | 12/1961 | Anderson et al. | 312/7.1 |
| 4,258,387 | 3/1981 | Lemelson | 348/18 |
| 4,604,064 | 8/1986 | Boehm et al. | 434/224 |
| 4,837,590 | 6/1989 | Sprague | 206/576 |
| 4,896,776 | 1/1990 | Kabanuk et al. | 206/576 |
| 5,226,540 | 7/1993 | Bradbury | 364/708.1 |
| 5,404,583 | 4/1995 | Lazezari et al. | 455/351 |

FOREIGN PATENT DOCUMENTS

| | | | |
|---|---|---|---|
| 0882576 | 6/1955 | Germany | 312/7.1 |
| 4128972 | 3/1993 | Germany | 455/90 |

OTHER PUBLICATIONS

Sodano, Joseph F., "A 'Basket Chassis' Transmitter" Radio & Television News, Jan. 1954 pp. 42 & 43.

*Primary Examiner*—David E. Harvey
*Attorney, Agent, or Firm*—Fleshner & McConathy, PLLC

[57] ABSTRACT

A housing for a portable integrated communications system, comprising: a suitcase for housing said portable integrated communications system having a lid and a bottom portion, said bottom portion having a bottom and sides, said sides having a holding ledge attached thereto; a plate having a top and a bottom and being capable of fitting within said bottom portion with a spacing between said sides of said suitcase and said plate, said plate being supported in said bottom portion of said suitcase by said holding ledge; and attachment means for attaching said portable integrated communications system to said plate such that said portable integrated communications system does not contact said suitcase.

18 Claims, 19 Drawing Sheets

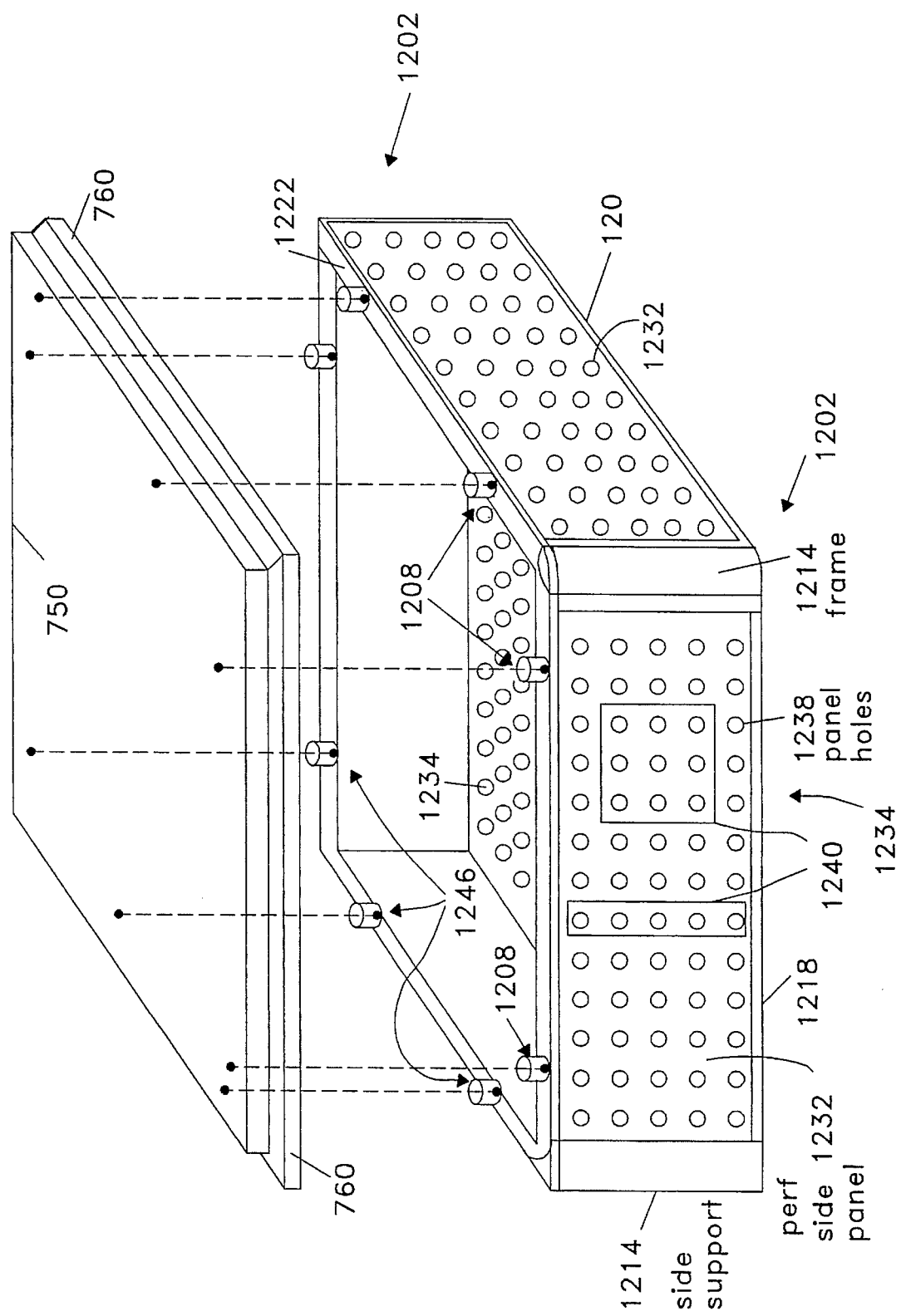

HOUSING AND PORTABLE INTEGRATED SATELLITE COMMUNICATIONS SYSTEM

BACKGROUND OF THE INVENTION

This application is a continuation-in-part of U.S. patent application Ser. No. 08/085,329 filed Jul. 2, 1993, which in turn was a continuation-in-part of U.S. patent application Ser. No. 08/047,089, filed Apr. 16, 1993, the contents of both of which are incorporated herein by reference.

1. Field of the Invention

This invention relates generally to a portable apparatus for transmitting information from one location to another and in particular to a housing and a portable satellite communications system capable of digitizing, compressing and transmitting video information from a first location and receiving, decompressing and viewing the video signal at a second location, wherein the housing houses the satellite communication system in an easy to set up, take down and transport arrangement and protects the system from weather damage such as rain as well as from bumps, jolts and other damaging forces while maintaining a light weight system.

2. Description of Related Art

A news team frequently has to transmit a video clip of a news story at some remote location site back to a home television station. Typically, the news team accomplishes this by either using their own earth station with a satellite dish and uplink electronics or renting such an earth station from a third party. Often, however, the television station cannot afford such an earth station or none is available from a third party and consequently the news team must rely on a nearby government ministry-owned satellite earth station.

FIG. 1A shows a truck 10 with a satellite dish 16 which together serve as a point-of-origin independent earth station 14. In order to be point-of-origin independent, earth station 14 must use the C or Ku-band and consequently the diameter of the dish 16 must be at least 10 to 15 meters. Truck 10 contains all uplink electronics required to transmit microwave signals in the C or Ku band. A video signal is modulated onto a microwave signal and then is amplified and transmitted to a satellite 20 typically owned by some government agency. That government agency is not necessarily associated with the country in which the earth station is located. The microwave signal is then downlinked to another large microwave dish 24 at television station 28 where it can be broadcast live to a surrounding area or taped for broadcast at a later time. Alternatively, local television station 28 can retransmit the video clip from dish 24 to another television station 29 having its own dish 30 with a diameter of about 8–12 feet (FIG. 1B). A local television station 29 can then rebroadcast the video clip to its local viewers.

This process has a variety of drawbacks. For example, earth station 14 is very large, heavy and has expensive uplink electronics. Also, earth station 14 can weigh several tons and, consequently, shipping such a system itself can become very expensive. Truck 10 with uplink electronics and large dish 16 can require 6 to 8 men to assemble and operate. In addition, earth station 14 can cost several hundred thousand dollars to own, or tens of thousands of dollars to rent on a per day basis. Therefore, it is important that any portable satellite communications systems be housed in a housing which can withstand significant forces, jolts, etc. This is particularly true when a news team must carry the communications system to remote locations. Similarly, even if the communications system remains in a transport vehicle of some kind, that vehicle must often travel through difficult terrain which can produce large forces which, without a proper housing, could damage or destroy the communications system.

It is further desirable to be able to transport the communications system in adverse weather conditions such as snow, sleet or rain. Therefore, a housing for the communications system must not only be capable of absorbing significant forces incurred during transport of the communications system, but must also be capable of preventing any moisture from reaching internal components of the communications system.

In addition to the above, excess weight can severely limit the portability of the system and housing. Consequently, the housing above should be relatively light-weight and not add substantial weight to the complete system.

It is also desirable that individual components of the communications system be arranged in such a way as to provide easy access to them for replacement when necessary. The housing should also be compartmentalized in such a way that the communications system with its transmitting and receiving antenna can be quickly and easily set up for transmission and reception. The housing should also be compartmentalized in such a way that components of the system are shielded from microwaves.

The process described with reference to FIG. 1A has further drawbacks. For example, in order to operate earth station 14, the news team must obtain a license from the country in which the earth station 14 is located. Since earth station 14 must be shipped to the local country, it also has to pass through that country's local customs office.

Even after all of the above drawbacks are overcome, the news team cannot send the video clip from earth station 14 to television station 28 until several more steps have been performed. First, earth station 14 must contact the appropriate government agency which operates satellite 20 and prebook a specific time period during which the video clip will be transmitted from earth station 14 to television station 28. In addition, earth station 14 and television station 28 both must know and use the protocol required by the particular agency or government which controls satellite 20. Moreover, since the time of transmission via satellite 20 must be prebooked, the uplink will fail if the news team does not have the taped news clip ready. Also, despite its size and complexity, earth station 14 does not typically contain equipment capable of editing the video clip before it is transmitted to television station 28 via satellite 20.

The above scenario can be described as a "best case" scenario since it was assumed that the television station has its own satellite dish 24 and can rent or own an earth station 14. This situation becomes even more complicated and nearly impossible if, for example, television station 28 has to rely on transmitting the video clip out of the country even using that country's government satellite earth station as shown FIG. 1B. In particular, FIG. 1B shows a government satellite earth station 40 with a large C or Ku dish 44 which uplinks C or Ku microwaves to satellite 20 which in turn downlinks these microwave signals to television station 28.

In this scenario, transmission from earth station 40 must be prebooked with the local government in addition to prebooking a transmission time slot with the government or agency which operates satellite 20. (These two governments are likely not the same.) Moreover, since the local government operates earth station 40, it can censor all such news clips and allow only those news clips or sections of news clips to be transmitted with which the government agrees.

Furthermore, many countries will not have such a satellite earth station. Consequently, those television stations which do not have access to earth station 40 or to an earth station similar to earth station 14 in FIG. 1A must hand carry or mail the video clip to television station 28 or to another country which does have such an earth station. Hence, by the time the video clip arrives at television station 28, the news it contains is old.

In addition to the above difficulties associated with uplinking a microwave signal to satellite 20, downlinking from satellite 20 to earth station 28 may involve one or more hops as shown in FIG. 1C. In particular, FIG. 1C shows microwave signals uplinked form either earth station 14 or governmental earth station 40 to satellite 20 which in turn must be downlinked (due to the location of satellite 20) to a first earth station 50 located, for example, in Europe. First earth station 50 must in turn uplink to a second satellite 20' which in turn downlinks to television station 28. During this process, the protocol of each link must be complied with. This creates an even greater burden on the news team.

Teleconferencing technology, like news gathering and broadcasting technology, involves transmitting video signals from one location to another. However, teleconferencing differs from news gathering in that news gathering typically involves transmitting high quality video images from a first location and receiving that information at a second location, whereas teleconferencing involves both transmitting and receiving video images at each of the first and second locations albeit not necessarily video images of broadcast quality.

FIG. 2 shows a first building 200 and a second building 240 interconnected via a high speed digital data network 250 such as (ACUNET) or integrated services digital network (ISDN). These networks are capable of transmitting digital information at rates of 64 kilobits/second (kbps) or in some cases 128 kbps. Network 250 must include a signal routing system 260 (typically owned and operated by a telephone company) and data lines 264 and 268 interconnecting teleconferencing equipment 274 in building 200 to teleconferencing equipment 278 in building 240. Signal routing system 260 can include a variety of satellite, fiber optic and standard hardwired links.

Teleconferencing equipment 274 and 278 must be capable of transmitting and receiving audio/video signals in real time. In order to do this, data lines 264 and 268 must be capable of transmitting more than the standard telephone line audio bandwidth of 9.6 kbps. Consequently, standard telephone lines cannot be used to interconnect teleconferencing equipment 274 to teleconferencing equipment 278.

ACUNET or ISDN interconnecting can transmit at high enough bit rates to enable interconnection of teleconferencing equipment. However, high speed digital (HSD) lines or ISDN lines have been installed in only a few cities throughout the United States and only in the main business districts of those cities. Moreover, only selected buildings within those main business districts have been hard wired with high speed data lines 264 and 268. Also, installation of such high speed data lines is a long and expensive process.

Returning to FIG. 1A, the process of sending a video clip from a remote location has a variety of additional drawbacks. The news information must be sent from point to point (a serial type of data transfer) rather than from point to multi-point (a parallel type of information transfer). Also, television station 28 can only receive in one direction (the direction in which it is pointed) and can only simultaneously transmit in multiple directions if it has multiple satellite dishes. This process has the further limitation of transmitting and storing video clips in analog form and consequently is not readily compatible with digital land networks such as ACUNET. Also, the current process does not provide on-demand news, but instead news clips must be transmitted on a prearranged basis from satellite earth station 40 to television station 28 and from television station 28 to television station 29.

In addition to the above, it is important that portable communications systems be housed in a housing which can withstand significant forces, jolts, etc. This is particularly true when a news team must carry the communications system to remote locations. Similarly, even if the communications system remains in a transport vehicle of some kind, that vehicle must often travel through difficult terrain which can produce large forces which, without a proper housing, could damage or destroy the communications system.

It is further desirable to be able to transport the communications system in adverse weather conditions such as snow, sleet or rain. Therefore, a housing for the communications system must not only be capable of absorbing significant forces incurred during transport of the communications system, but must also be capable of preventing any moisture from reaching internal components of the communications system.

In addition to the above, excess weight can severely limit the portability of the system and housing. Consequently, the housing above should be relatively light-weight and not add substantial weight to the complete system.

It is also desirable that individual components of the communications system be arranged in such a way as to provide easy access to them for replacement when necessary. The housing should also be compartmentalized in such a way that the communications system with its transmitting and receiving antenna can be quickly and easily set up for transmission and reception. The housing should also be compartmentalized in such a way that components of the system are shielded from microwaves.

SUMMARY OF THE INVENTION

It is an object, therefore, of the invention to provide a housing for a communications system which can withstand significant jolts and forces while preventing damage to components in the communications system itself.

Another object of the invention is to provide a housing which can prevent moisture from reaching components of the communications system and protect the communications system from the weather such as rain, sleet or snow.

Another object of the invention is to provide a housing in which components of the communications system can be easily set up for transmission and reception.

Another object of the invention is to provide a housing in which components of the communications system are shielded from microwaves.

Another object of the invention is to provide a portable transmission and reception system capable of transmitting and/or receiving information from one location to another via satellite.

Another object of the invention is to provide a transmission system which can transmit a broadcast quality audio/video signal via microwave signals without using a local earth station.

Another object of the invention is to provide a transmission and reception system, wherein the transmission and reception system includes editing equipment for editing a video clip before transmission.

Another object of the invention is to provide a communications system in a housing, wherein the communications system can transmit audio/video information from a remote area without having to utilize multiple satellites on an ad hoc, prebooked and prearranged, event-by-event basis.

One advantage of the housing is that it can protect the communications system from external jolts and damaging forces.

Another advantage of the housing is that it prevents moisture from reaching components of the communications system.

Another advantage of the housing is that it allows individual components of the communications system to be arranged in such a way that they can be easily replaced.

Yet another advantage of the housing is that it makes it easy for a user to set up and take down the communications system.

Another advantage of the communications system together with the housing is that they can be used to transfer information independent of a local government communications protocol and in multi-satellite configurations, thereby transmitting information transparently and automatically.

Another advantage of the communications system and housing is that it is point of origin independent.

Another advantage of the invention is that it makes it possible to transmit and receive audio/video information from any place in the world to any place in the world except possibly at the extreme polar caps, despite having to endure jolts and shocks from rough terrain in order to reach remote locations.

One feature of the invention is that it utilizes a lightweight, non-rigid, durable suitcase capable of withstanding large external forces.

Another feature of the invention is that the suitcase can absorb shocks and jolts.

Another feature of the invention is that all of the equipment used for the communications system are secured to a metallic plate which rests on the ridge of the suitcase.

Another feature of the invention is that the plate is flexible.

Another feature of the invention is that components of the communications system are attached to panels which can be easily inserted and removed from the suitcase.

Another feature of the invention is that these panels are perforated, thereby acting as microwave shields.

Another feature of the invention is that the panels are attached to the flexible plate using a screw with a rubber stopper which absorbs forces between the panel and the flexible plate.

Another feature of the invention is that it utilizes an 0-ring along the edges of the suitcase in order to insure that moisture cannot reach individual components of the communications system while the housing is closed.

Another feature of the invention is that the flexible plate rests on the holding ledge within the suitcase and there is a spacing between the edges of the flexible plate and the sides of the suitcase.

Another feature of the invention is that a strip of shock absorbing material is sandwiched between the flexible plate and the holding ledge.

Another feature of the invention is that the panels are arranged in a frame which itself is attached to the plate yet cushioned therefrom with rubber cylinders to provide even more isolation.

Another feature of the invention is that certain highly shock sensitive components such as hard disk drives can be attached to a bottom panel of the frame but cushioned therefrom with further rubber cylinders to provide even more isolation.

These and other objects, advantages and features are accomplished by the provision of a housing for a portable integrated communications system, comprising: a suitcase for housing the portable integrated communications system having a lid and a bottom portion, the bottom portion having a bottom and sides, the sides having a holding ledge attached thereto; a plate having a top and a bottom and being capable of fitting within the bottom portion with a spacing between the sides of the suitcase and the plate, the plate being supported in the bottom portion of the suitcase by the holding ledge; and attachment means for attaching the portable integrated communications system to the plate such that the portable integrated communications system does not contact the suitcase.

These and other objects, advantages and features are further accomplished by the provision of a portable integrated transmission system, comprising: transmit interface means for transforming an analog signal into a digital signal; transmit signal processing means for compressing the digital signal into a compressed asynchronous signal; transmit signal converting means for converting the compressed asynchronous signal into a compressed synchronous signal; microwave transmitting means for generating a microwave signal and modulating the microwave signal with the compressed synchronous signal to produce a modulated microwave signal and for transmitting the modulated microwave signal; and a housing for housing the transmit interface means, the transmit signal processing means, the transmit signal converting means and the microwave transmitting means, including: a suitcase having a lid and a bottom portion, the bottom portion having a bottom and sides, the sides having a holding ledge attached thereto; and a plate having a top and a bottom and being capable of fitting within the bottom portion with a spacing between the sides of the suitcase and the plate, the plate being supported in the bottom portion of the suitcase by the holding ledge, attachment means for attaching the transmit interface means, the transmit signal processing means, the transmit signal converting means and the microwave transmitting means to the plate, wherein the transmit interface means, the transmit signal processing means, the transmit signal converting means and the microwave transmitting means do not contact the suitcase.

These and other objects, advantages and features are still further accomplished by the provision of a portable integrated receiving system, comprising: microwave receiving means for receiving a modulated microwave signal which has been modulated with a compressed synchronous signal and for demodulating the modulated microwave signal into the compressed synchronous signal; receive signal converting means for converting the compressed synchronous signal into a compressed asynchronous signal; receive signal processing means for decompressing the compressed asynchronous signal into a digital signal and outputting the digital signal; a housing for housing the microwave receiving means, the receive signal converting means, and the receive signal processing means, including: a suitcase having a lid and a bottom portion, the bottom portion having a bottom and sides, the sides having a holding ledge attached thereto; and a plate having a top and a bottom and being capable of fitting within the bottom portion with a spacing between the sides of the suitcase and the plate, the plate being supported in the bottom portion of the suitcase by the holding ledge, attachment means for attaching the microwave receiving means, the receive signal converting means and the receive signal processing means to the plate, wherein the microwave receiving means, the receive signal converting means and the receive signal processing means do not contact the suitcase.

These and other objects, advantages and features are further accomplished by the provision of a transmission and receiving system, comprising: transmit interface means for transforming an analog signal into a digital signal; transmit signal processing means coupled to the transmit interface means for compressing the digital signal into a compressed asynchronous signal; transmit signal converting means coupled to the transmit signal processing means for converting the compressed asynchronous signal into a compressed synchronous signal; microwave transmitting means coupled to the transmit signal converting means for generating a microwave signal and demodulating the microwave signal with the compressed synchronous signal to produce a first modulated microwave signal and for transmitting the first modulated microwave signal; microwave receiving means for receiving a second modulated microwave signal which has been modulated with the compressed synchronous signal and for demodulating the second modulated microwave signal yielding the compressed synchronous signal; receive signal converting means coupled to the microwave receiving means for converting the compressed synchronous signal into the compressed asynchronous signal; and second signal processing means coupled to the receive signal converting means for decompressing the compressed asynchronous signal into the digital signal and outputting the digital signal; and a housing for housing the transmit interface means, the transmit signal processing means, the microwave transmitting means, the microwave receiving means, the receive signal converting means and the second signal processing means, the housing including: a suitcase having a lid and a bottom portion, the bottom portion having a bottom and sides, the sides having a holding ledge attached thereto; a plate having a top and a bottom and being capable of fitting within the bottom portion with a spacing between the sides of the suitcase and the plate, the plate being supported in the bottom portion of the suitcase by the holding ledge; and attachment means for attaching the transmit interface means, the transmit signal processing means, the microwave transmitting means, the microwave receiving means, the receive signal converting means and the second signal processing means to the plate such that the transmit interface means, the transmit signal processing means, the microwave transmitting means, the microwave receiving means, the receive signal converting means and the second signal processing means do not contact the suitcase.

The above and other objects, advantages and features of the present invention will become more apparent from the following description of embodiments thereof taken in conjunction with the accompanying drawings.

BRIEF DESCRIPTION OF THE DRAWINGS

FIG. 12A shows a basket frame which is attached to the underside of the plate and FIG. 12B shows the frame as viewed from the side without side panels.

DETAILED DESCRIPTION OF THE PREFERRED EMBODIMENTS

Figure 1A:
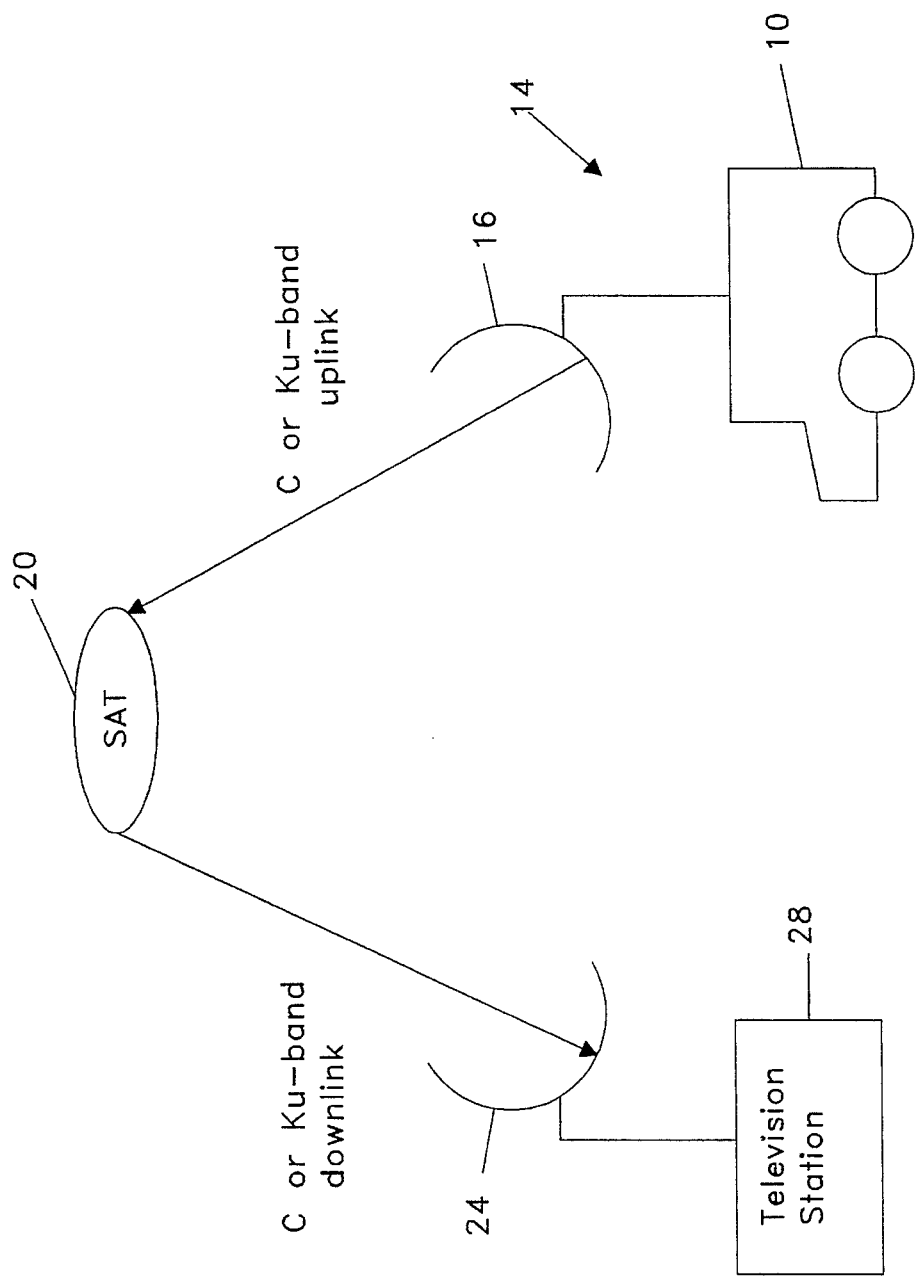
FIGS. 1A and 1B show a truck with a satellite dish which together serve as a point-of-origin independent earth station and a government satellite earth station, respectively.
Figure 1B:
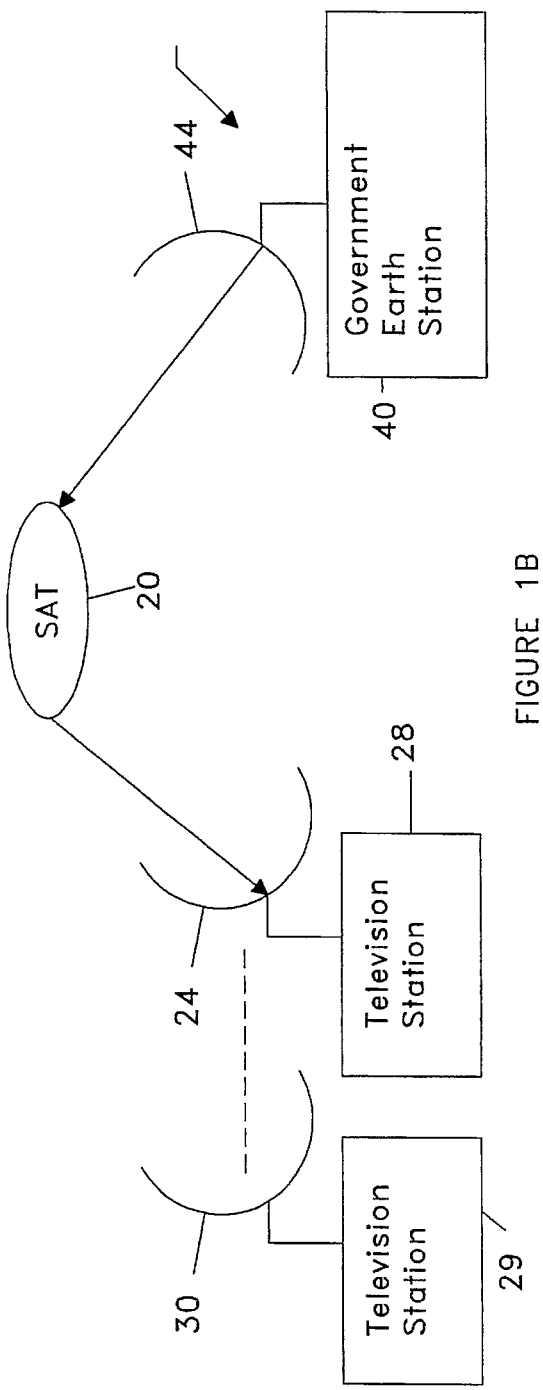
Figure 1C:
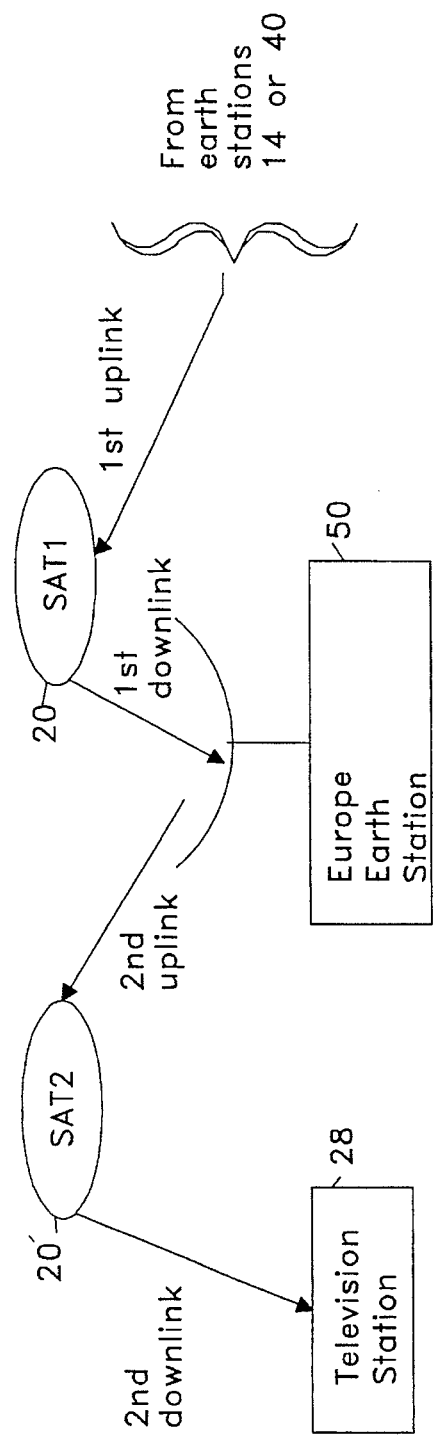
FIG. 1C shows microwave signals uplinked from either the earth station of FIG. 1A or the governmental earth station of FIG. 1B.
Figure 2:
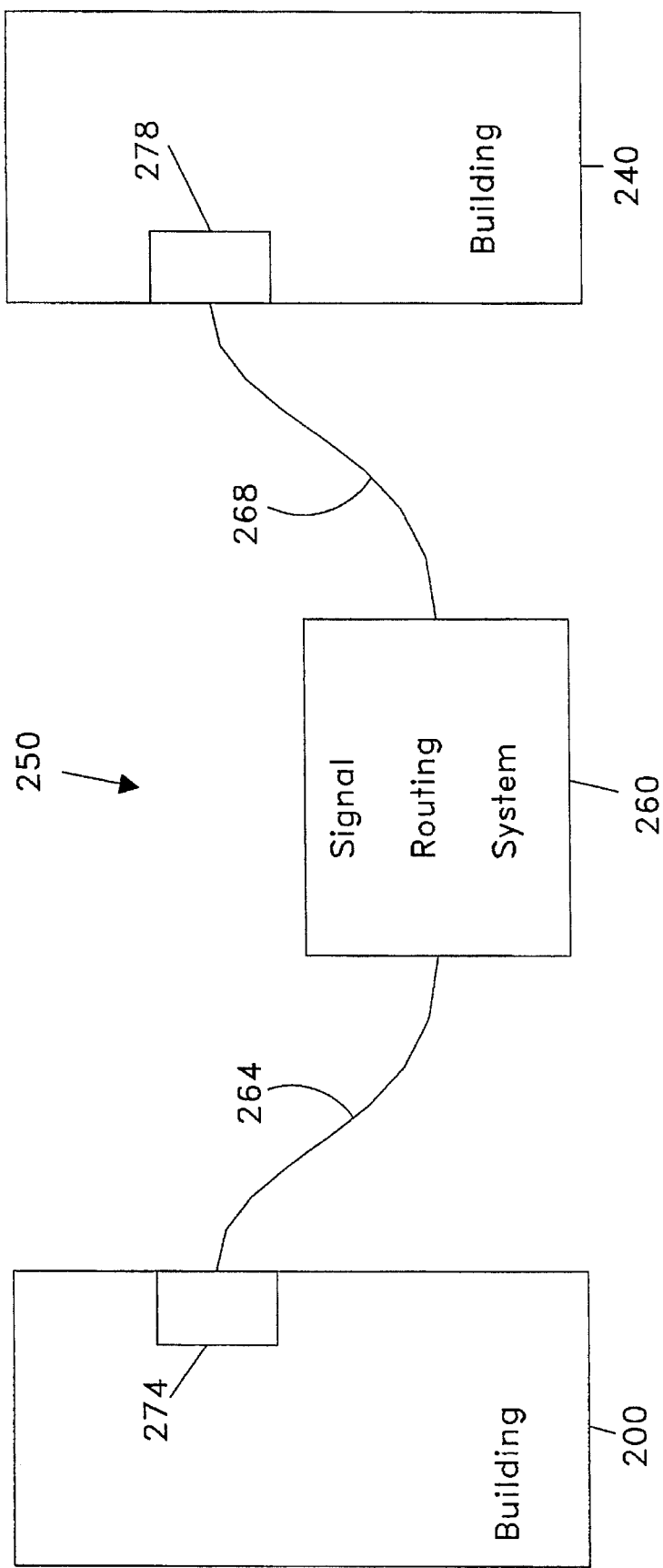
FIG. 2 shows a first building and a second building connected via a high speed digital data network such as ACUNET or ISDN.
Figure 3A:
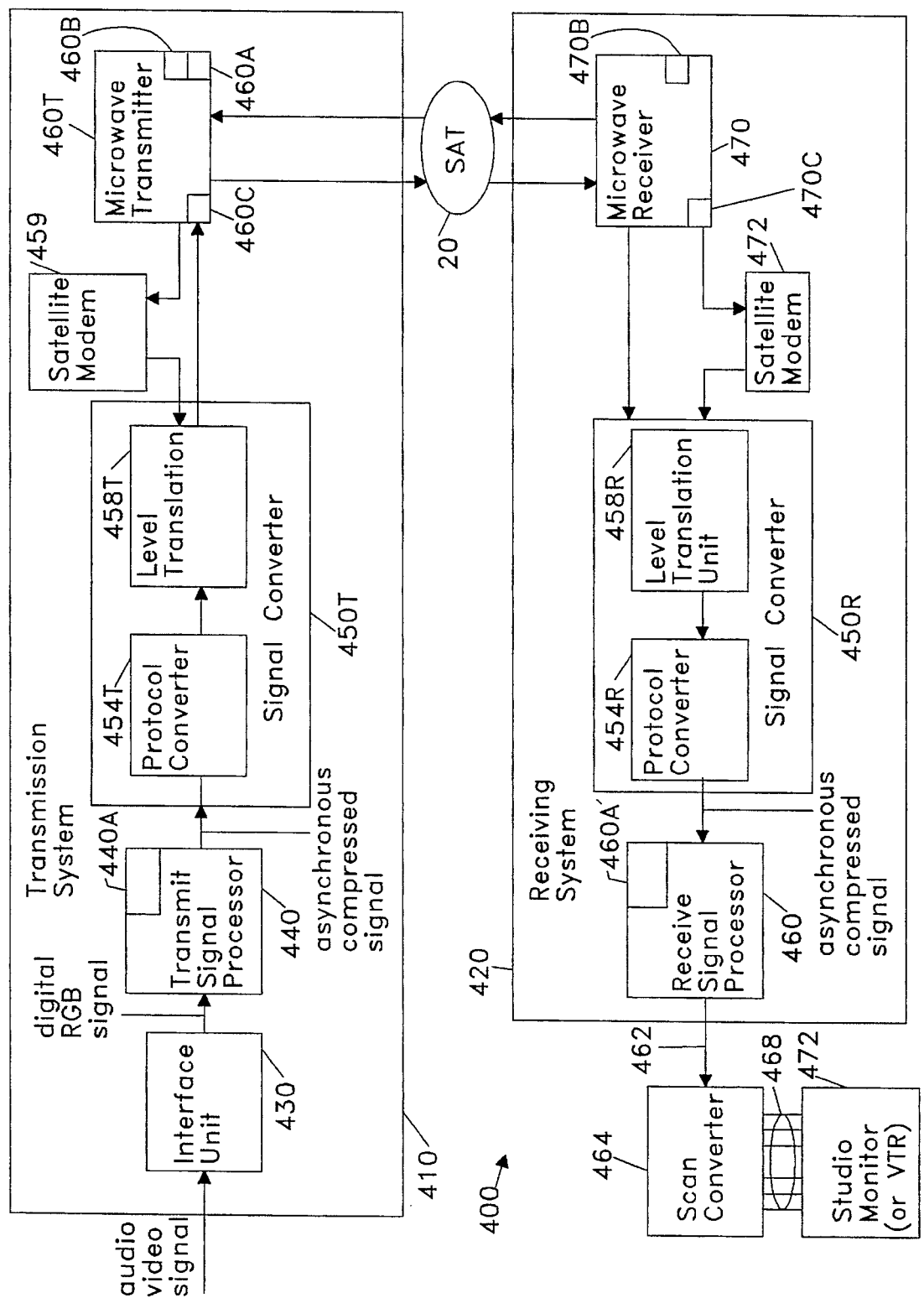
FIGS. 3A and 3B show a transmission and receiving system to be housed in a housing according to one embodiment of the invention.
Figure 3B:
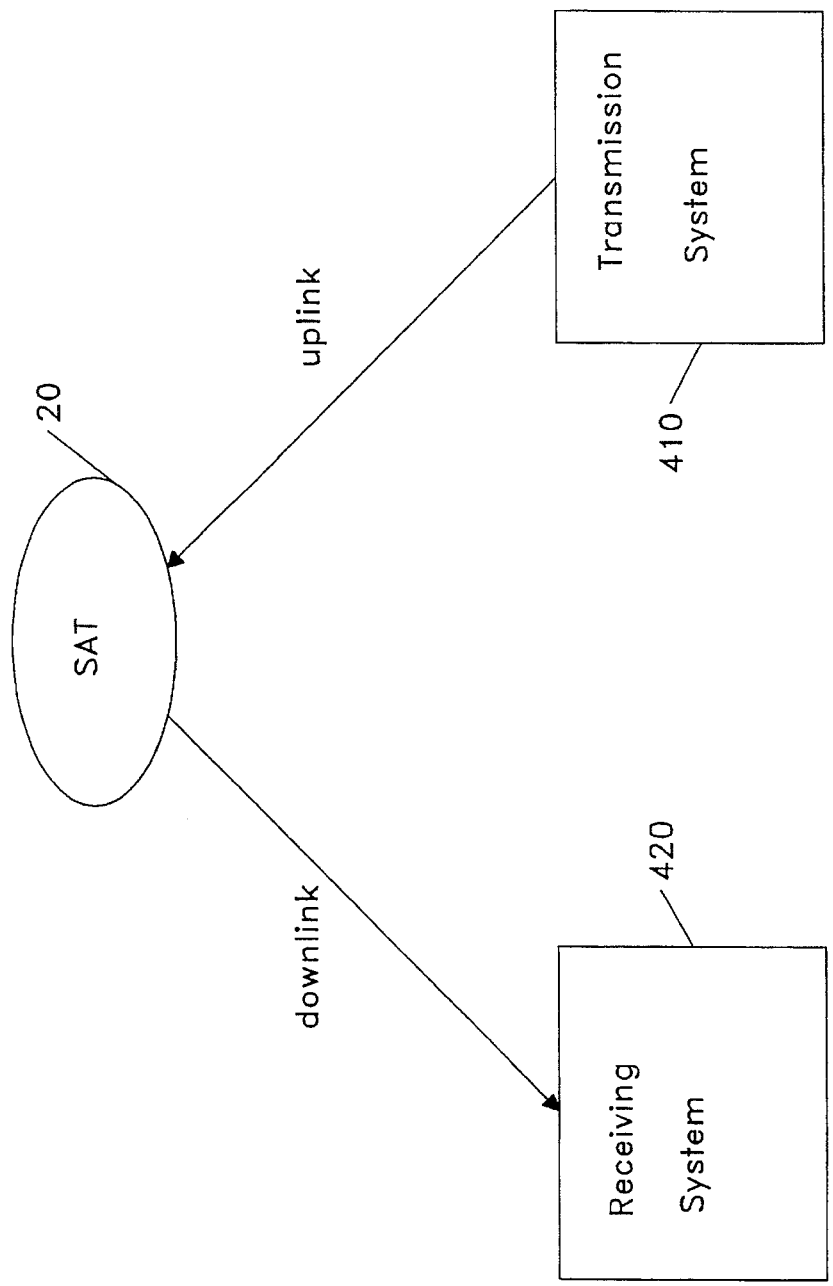

FIGS. 3A and 3B show a transmission and receiving system 400 according to one embodiment of the invention. In particular, FIG. 3A shows a transmission system 410 at a first location which communicates with a receiving system 420 at a second location via satellite 20. Throughout this discussion, embodiments of the invention will be described with respect to transmitting audio/video information, it being understood that the invention will transmit any type of analog or digital information such as digital data files, sensor signals (analog or digital), etc.

Transmission system 410 includes an interface unit 430 which receives an analog audio signal and an analog video signal which will be referred to here as an analog audio/video signal and transforms that analog audio/video signal into a digital red, green, blue (RGB) signal. The audio/video signal can come from a camera or a video tape recorder (VTR) neither of which is shown in the Figure. Interface unit 430 demodulates the audio/video signal which is either NTSC, PAL, or SECAM signal and outputs the digital RGB signal. The digital RGB signal output from interface unit 430 is then received by a transmit signal processor 440 which compresses the digital RGB signal into an asynchronous compressed signal and stores that asynchronous compressed signal on a hard disk 440A. Transmit signal processor 440 can then output the asynchronous compressed signal at high speeds using a high speed modem (not shown). The asynchronous compressed signal is in turn received by a signal converter 450T which includes a protocol converter 454T and a level translation unit 458T. Protocol converter 454T receives the asynchronous compressed signal and converts that signal to a synchronous compressed signal. The synchronous compressed signal is then input to level translation unit 458T which swaps wires and translates the synchronous compressed signal voltage levels into a level translated synchronous compressed signal which is received by a microwave transmitter 460T. Microwave transmitting 460T includes a modulator which modulates the synchronous compressed signal onto a modulated L-band microwave signal. Microwave transmitter 460T then transmits the modulated L-band microwave signal to satellite 20 (which can include one or more earth stations) which receives the L-band microwave signal and transmits that signal to receiving system 420. In particular, microwave transmitter 460T includes an L-band microwave generator 460A, a satellite dish 460B and a microwave modulator 460C. Satellite modem 459 monitors the transmission of the modulated microwave signal from microwave transmitter 460T to receiving system 420. In particular, satellite modem 459 performs handshaking with receiving system 420 at the beginning of transmission and continues to monitor the transmission to determine whether receiving system 420 is being sent the correct signal.

Receiving system 420 includes a microwave receiver 470 which receives the modulated microwave signal and demodulates that signal. Satellite modem 472 performs handshaking with transmission system 410 in a manner similar to satellite modem 459. Microwave receiver 470 includes a microwave demodulator 470C and a microwave dish 470B. A receive signal converter 450R which includes a level translation unit 458R and a protocol converter 454R is similar to signal converter 450T with corresponding level translation unit 458T and protocol converter 454T, respectively. Signal converter 450R operates like signal converter 450T used in the reverse direction. Namely, level translation unit 458R receives a level translated demodulated signal and translates the level of that signal back down to a synchronous (RS-232) signal which can be received by protocol converter 454R and converted to an asynchronous compressed signal. This asynchronous compressed signal is then received by receive signal processor 460 which decompresses it and stores it on a hard disk 460A'. If the decompression of the asynchronous compressed signal received by receive signal processor 460 is the inverse of the compression which the digital RGB signal underwent in transmit signal processor 440, receive signal processor 460 outputs that same digital RGB signal. Consequently, the digital signal at the first location is available at the second location. A scan converter 464 can receive this digital signal and drive a studio monitor 472 via bus 468.

Figure 4A:
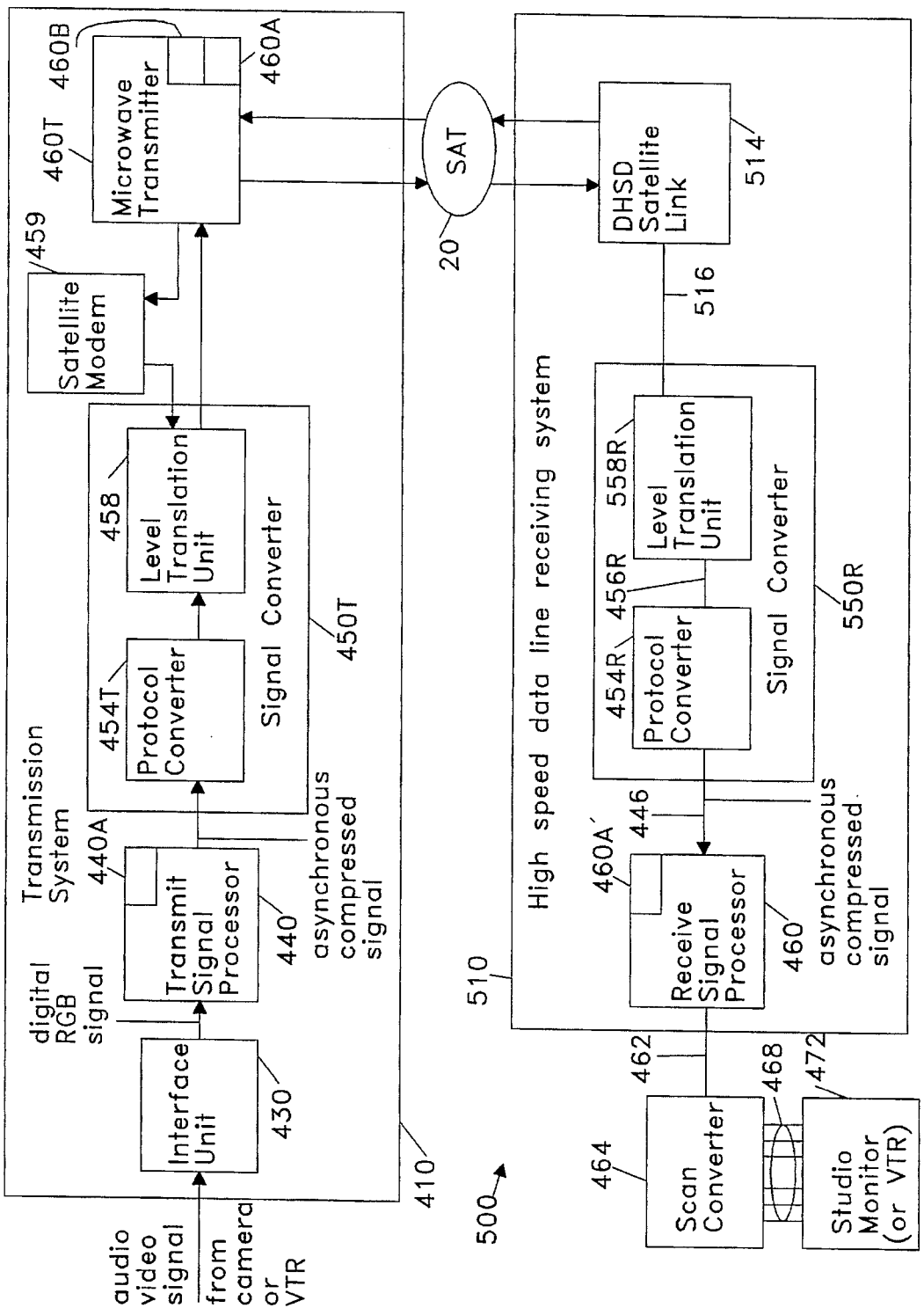
FIGS. 4A and 4B show a transmission and digital receiving system to be housed in the housing.
Figure 4B:
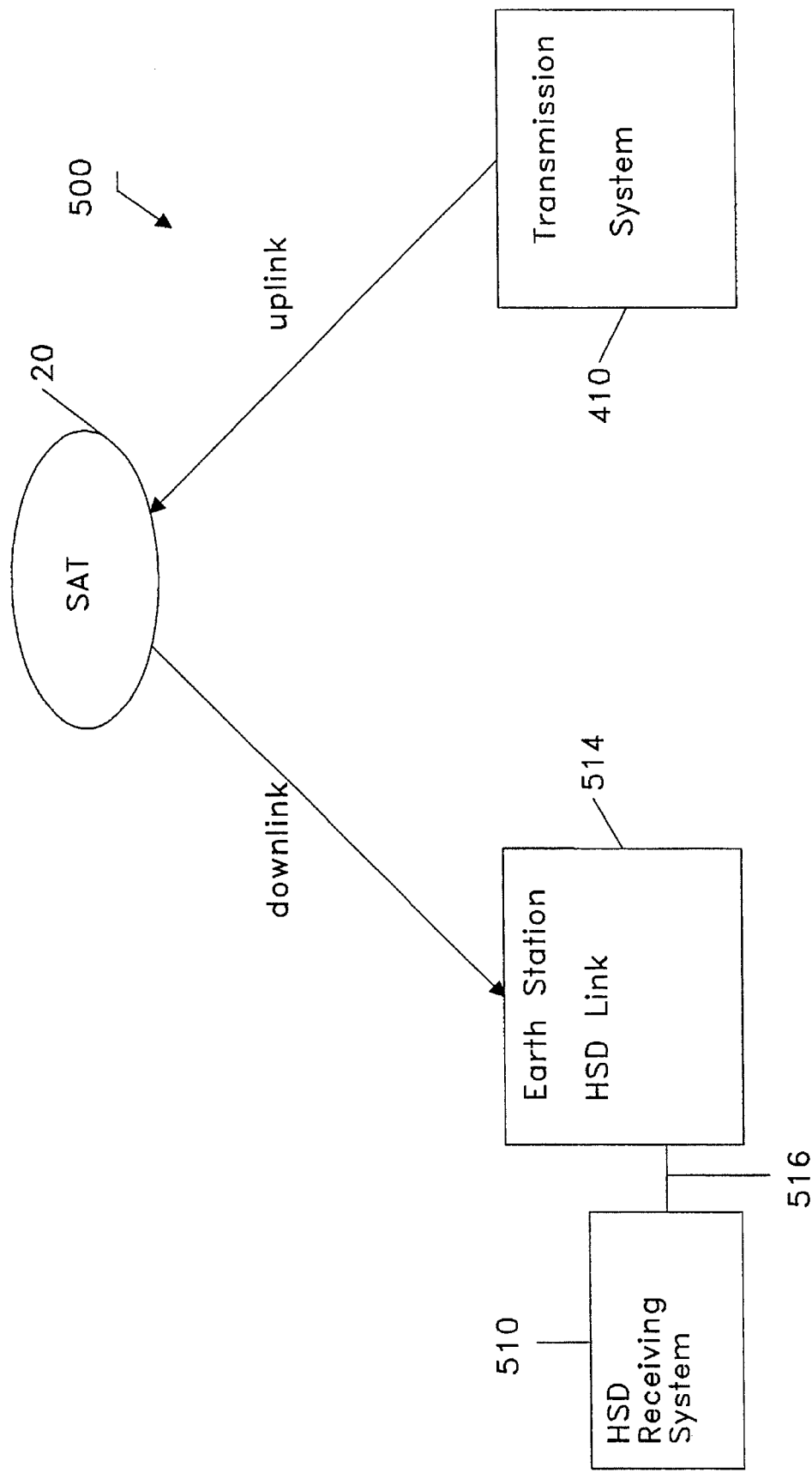

FIGS. 4A and 4B show a transmission system and digital receiving system 500 according to another embodiment of the invention. Those elements in system 500 which are also used in transmission and receiving system 400 will be given the same reference numerals. Transmission 410 is identical to system 410 in system 400 of FIG. 3A. However, instead of receiving microwave signals from satellite 20 via microwave receiver 470 as in FIG. 3A, a digital receiving system 510 receives digital data from a digital high speed data line (DHSD) link 514 available from a phone company. Receiving system 510 includes a signal converter 550R followed by receive signal processor 460. Signal converter 450R includes level translation unit 558R followed by protocol converter 454R.

The microwave signal modulated with compressed digital data is received by a satellite dish (here considered to be part of DHSD link 514) and in turn demodulated to yield a demodulated high speed digital (HSD) signal on DHSD line 516. DHSD link 514 includes satellite, fiber optic and hard wire links. Signal converter 550R receives the digital signal at level translation unit 558R which translates its voltage level for transmission on serial line 456R as a synchronous compressed signal. Protocol converter 454R receives and transforms the synchronous compressed signal into an asynchronous, compressed signal for transmission on bus 446. Receive signal processor 460 in turn receives and decompresses the asynchronous, compressed signal into a digital RGB signal ready to be received and converted by scan converter 464 via line 462 for display via bus 468 on monitor (or VTR) 472.

Figure 5A:
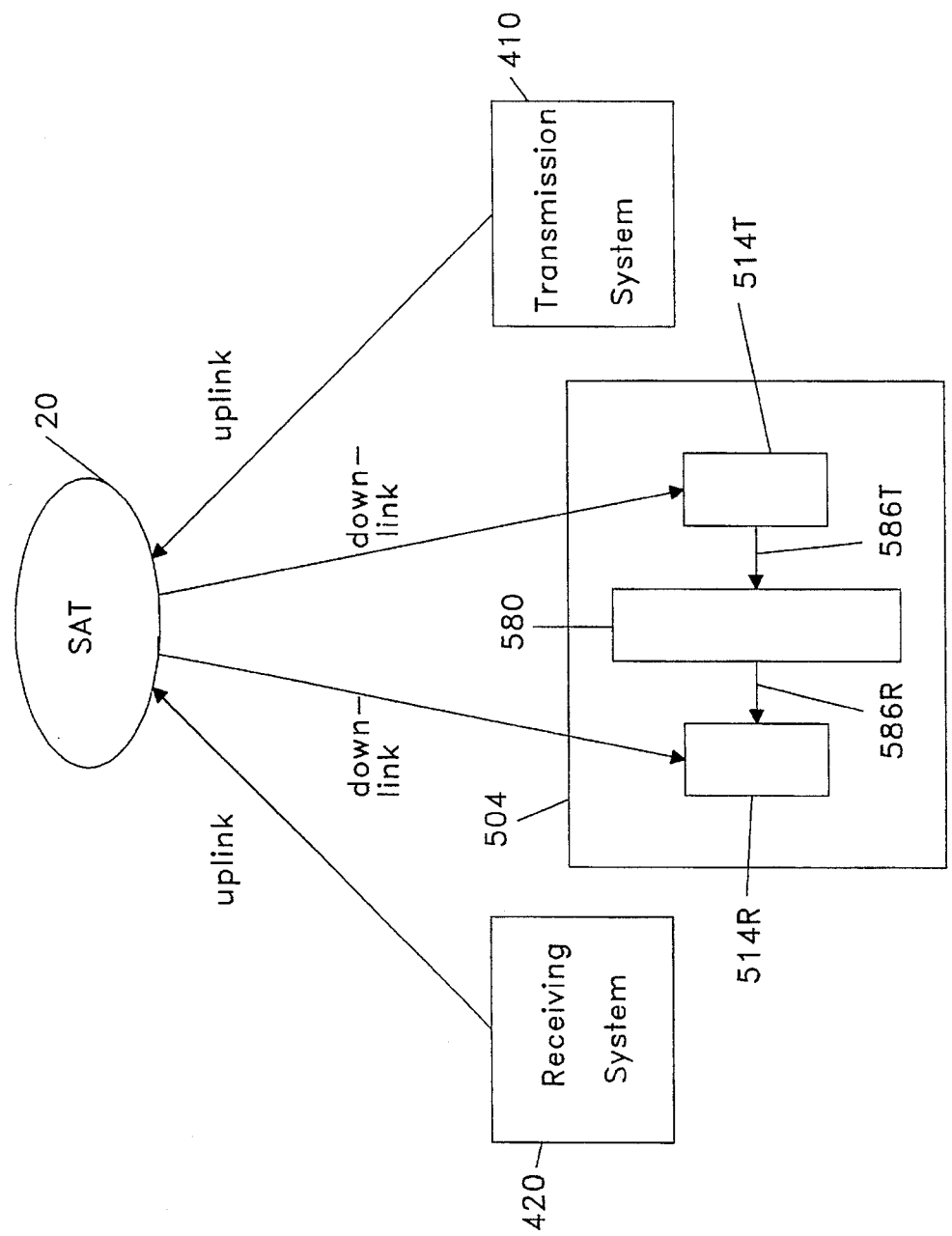
FIGS. 5A and 5B show an alternative transmission system and receiving system which communicate with each other via a patch unit.
Figure 5B:
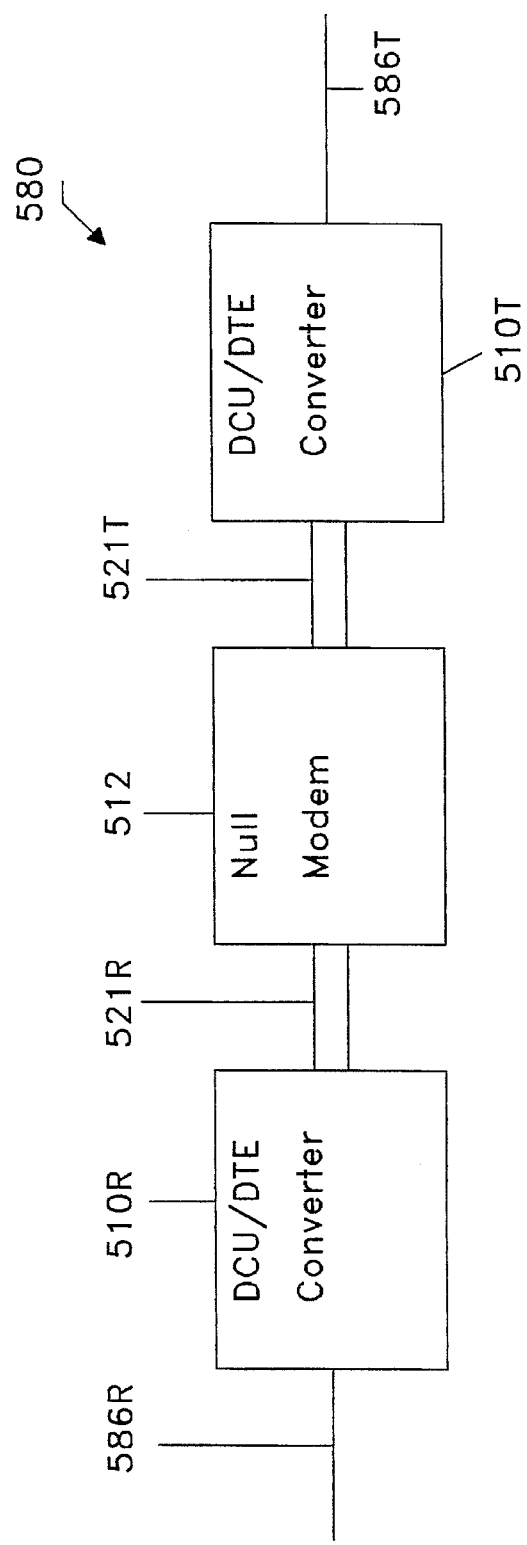

FIG. 5A shows an alternative way in which transmission system 410 and receiving system 420 can communicate with each other by using a patch unit 580. FIG. 5B shows a closer view of patch unit 580. Referring to FIG. 5A, transmission system 410 outputs a microwave signal with a digitized and compressed video clip modulated onto the microwave signal. Satellite 20 receives the microwave signal from transmission system 410 and downlinks the microwave signal to a transmitting DHSD link 514T identical to DHSD link 514 of FIG. 4A. Transmitting DHSD link 514T receives the microwave signal via a satellite (not shown), transforms that signal into an HSD signal and transmits that HSD signal to patch unit 580 via line 586T. Patch unit 580 then routes that signal to a receiving line 586R. Receiving DHSD link 514R receives the HSD signal, transforms that signal into a microwave signal and transmits that microwave signal back to satellite 20. Satellite 20 receives that microwave signal and transmits it to receiving system 420 which receives it and eventually outputs a digital RGB signal.

FIG. 5B shows a closer view of patch unit 580. Patch unit 580 includes a DCU/DTE conversion unit 510T connected to a null modem 512 followed by a DCU/DTE conversion unit 510R. Line 586T transmits the HSD signal output from DHSD transmission link to DCU/DTE converter 510T and outputs a digital signal on a V.35 pin bus 521T to null modem 512. Null modem 512 is wired so that both DCU/DTE converters 510T and 510R operate as if they are connected to a regular DCU modem. Null modem 512 outputs the digital signal on V.35 pin bus 521R to DCU/DTE converter 510R which receives it and outputs the digital signal via 586R to DHSD link 514R for eventual transmission to satellite 20.

Figure 6A:
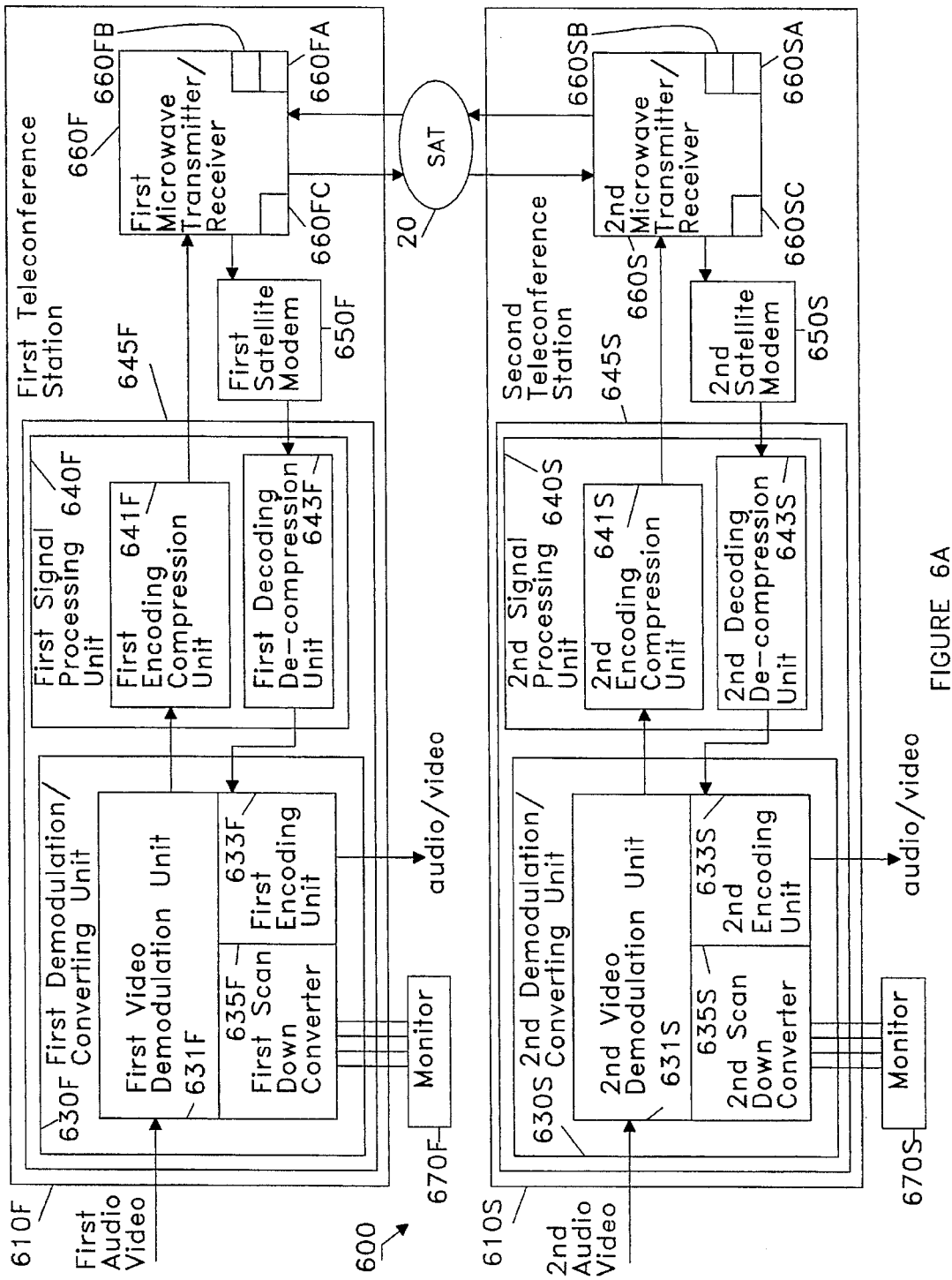
FIGS. 6A and 6B show a teleconference system which can be housed in the housing.
Figure 6B:
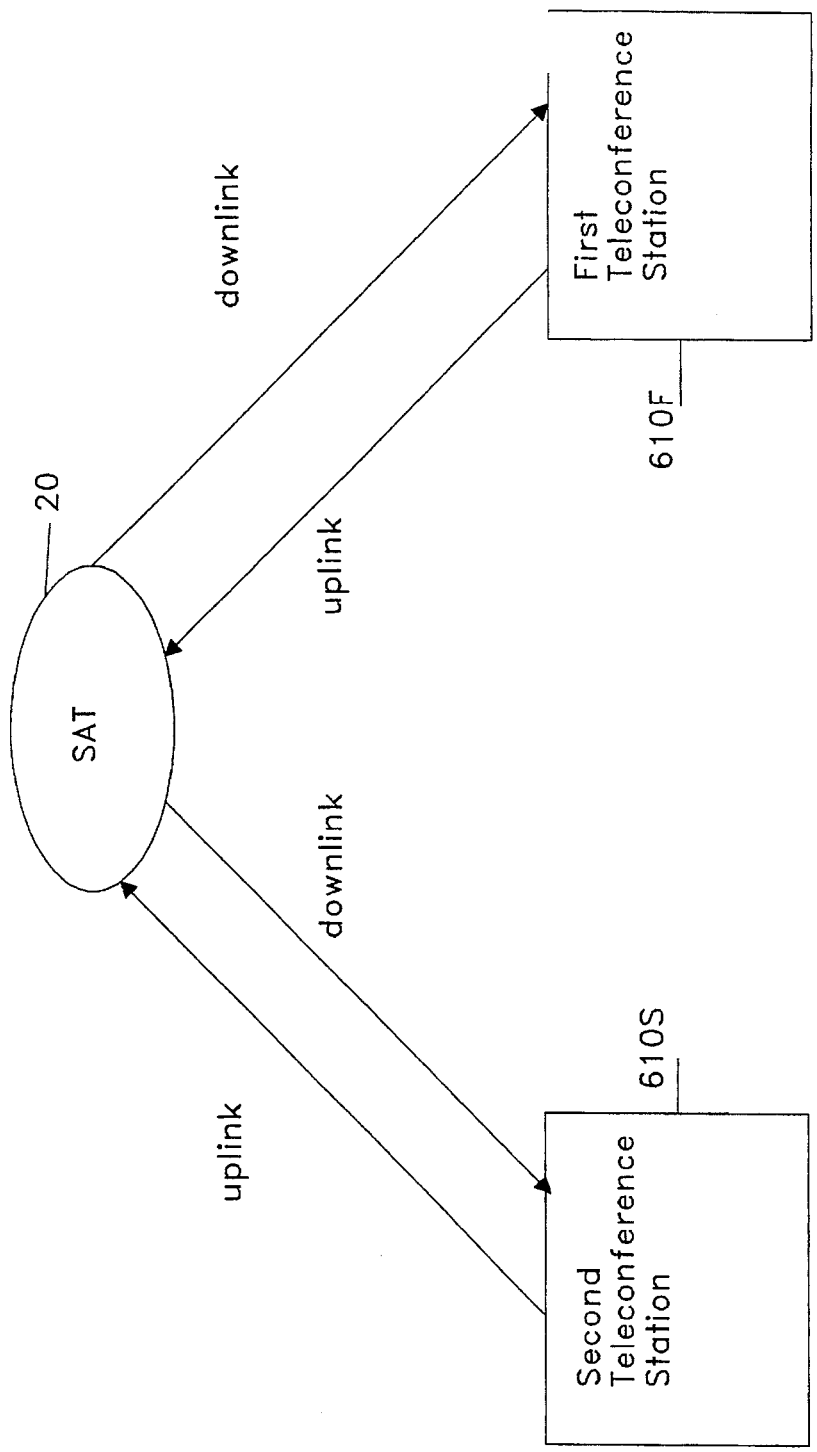

FIGS. 6A and 6B show a teleconference system 600 according to another embodiment of the invention. In particular, teleconference system 600 includes a first teleconference station 610F at a first location and an identical second teleconference station 610S at a second location. First and second teleconference stations 610F and 610S have first and second demodulation/converting units 630F and 630S, first and second signal processing units 640F and 640S, first and second satellite modems 650F and 650S and microwave transmitter/receivers 660F and 660S, respectively. First and second microwave transmitter/receivers 660F and 660S include L-band microwave generators 660FA and 660SA, satellite dishes 660FB and 660SB and microwave modulator 660FC and 660SC, respectively. First and second demodulation/converting units 630F and 630S include first and second video demodulation units 631F and 631S, first and second encoding units 633F and 633S and first and second scan down converters 635F and 635S, respectively. Also, first and second signal processing units 640F and 640S include first and second encoding/compression units 641F and 641S, as well as first and second decoding/decompression units 643F and 643S, respectively. First demodulation/converting unit 630F together with first signal processing unit 640F make up a first two-way digital video processor 645F. Similarly, second demodulation/converting unit 630S together with second signal processing unit 640S make up a second two-say digital video processor 645S.

Teleconference system operates to send a first audio/video signal from a first camera (not shown) to be displayed by second monitor 670S at second teleconference station 610S while simultaneously sending a second audio/video signal from a second camera (not shown) at second teleconference station 610S to be displayed by first monitor 670F at first teleconference station 610F. Each of these processes is described below.

A first analog audio/video signal is sent from first teleconference station 610F to second teleconference station 610S as follows. The first analog audio/video signal output from a first camera (not shown) at the first location is input to first video demodulation unit 631F. First video demodulation unit 631F then digitizes and demodulates the first analog audio/video signal and outputs a resulting first digital signal. The first digital signal is then input to first encoding/compression unit 641F which can compensate for a high degree of motion, thereby providing smoother, sharper, "non-pixelized" or jittering pictures. First encoding/compression unit 641F in turn encodes and compresses the first digital signal and outputs a first compressed, encoded signal. The first compressed, encoded signal is then received by first microwave transmitter/receiver 660F, which in turn modulates a first microwave signal with the first compressed, encoded signal and transmits a resulting first modulated microwave signal to satellite 20.

Satellite 20 receives the first modulated microwave signal and outputs a downlinking modulated microwave signal having the first compressed, encoded signal modulated thereon. Second microwave transmitter/receiver 660S in second teleconference station 610S receives and demodulates this downlinking modulated signal into the first compressed, encoded signal. Second satellite modem 650S monitors second transmitter/receiver 660S to insure that the signal output from second microwave transmitter/receiver 660S is the same as the first compressed, encoded signal which was earlier output from first signal processing unit 640F. Second transmitter/receiver 660S outputs the first compressed, encoded signal to second decoding/decompression unit 643S in second signal processing unit 640S. Second decoding/decompression unit 643S demodulates and decompresses the first encoded, compressed signal into the first digital signal which is the same as the first digital signal output from first demodulation/converting unit 630F in first teleconference station 610F. This first digital signal is then received by second encoding unit 633S of second demodulation/converting unit 630S to be encoded into NTSC or PAL protocol for viewing on a television set (not shown). Alternatively, the first digital signal is received by second scan down converter 635S of second demodulation/converting unit 630S which outputs a display signal to be viewed on second studio monitor 670S.

A second analog audio/video signal is sent from second teleconference station 610S to first teleconference station 610F as follows. The second analog audio/video signal is output from a second camera (not shown) at the second location and input to second video demodulation unit 631S. Second video demodulation unit 631S then digitizes and demodulates the second analog audio/video signal and outputs a resulting second digital signal. The second digital signal is then input to second encoding/compression unit 641S of second signal processing unit 640S. Second encoding/compression unit 641S in turn encodes and compresses the second digital signal and outputs a second compressed, encoded signal. The second compressed, encoded signal is then received by second microwave transmitter/receiver 660S, which in turn modulates a second microwave signal with the second compressed, encoded signal and transmits a resulting second modulated microwave signal to satellite 20.

Satellite 20 receives the second modulated microwave signal and outputs a downlinking modulated microwave signal having the second compressed, encoded signal modulated thereon. First microwave transmitter/receiver 660F in first teleconference station 610F receives and demodulates this downlinking modulated signal into the second compressed, encoded signal. First satellite modem 650F monitors first transmitter/receiver 660F to insure that the signal output from first microwave transmitter/receiver 660F is the same as the second compressed, encoded signal which was earlier output from second signal processing unit 640S. First transmitter/receiver 660F outputs the second compressed, encoded signal to first decoding/decompression unit 643F in first signal processing unit 640F. First decoding/decompression unit 643F demodulates and decompresses the second encoded, compressed signal into the second digital signal which is the same as the second digital signal output from second demodulation/converting unit 630S in second teleconference station 610S. This second digital signal is then received by first encoding unit 633F of first demodulation/converting unit 630F to be encoded into NTSC or PAL protocol for viewing on a television set (not shown). Alternatively, the second digital signal is received by first scan down converter 635F of first demodulation/converting unit 630F which outputs a display signal to be viewed on first studio monitor 670F.

Figure 7A:
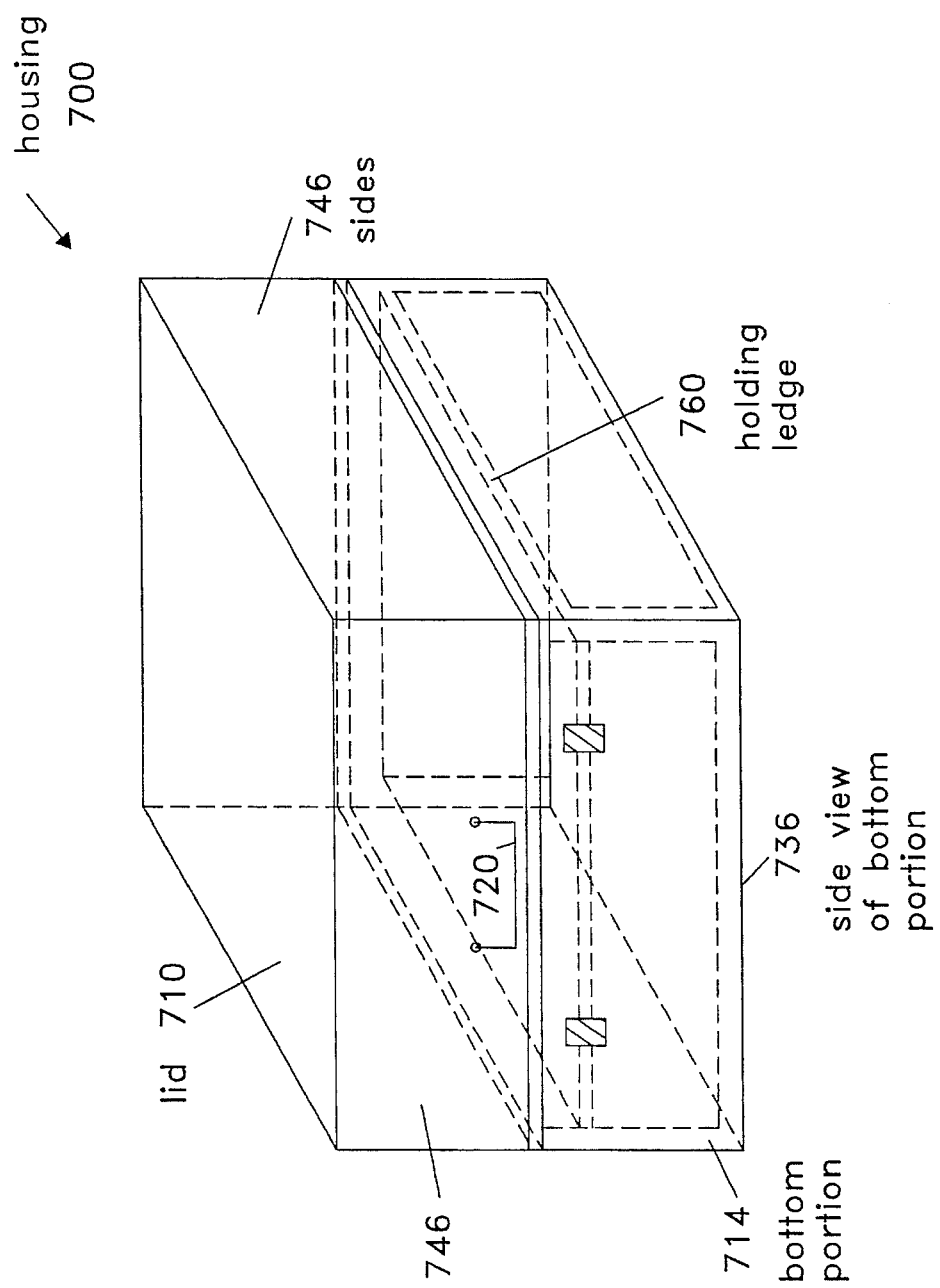
FIG. 7A shows the housing with a lid and a bottom portion according to one embodiment of the invention and FIG. 7B shows the housing with the lid removed.
Figure 7B:
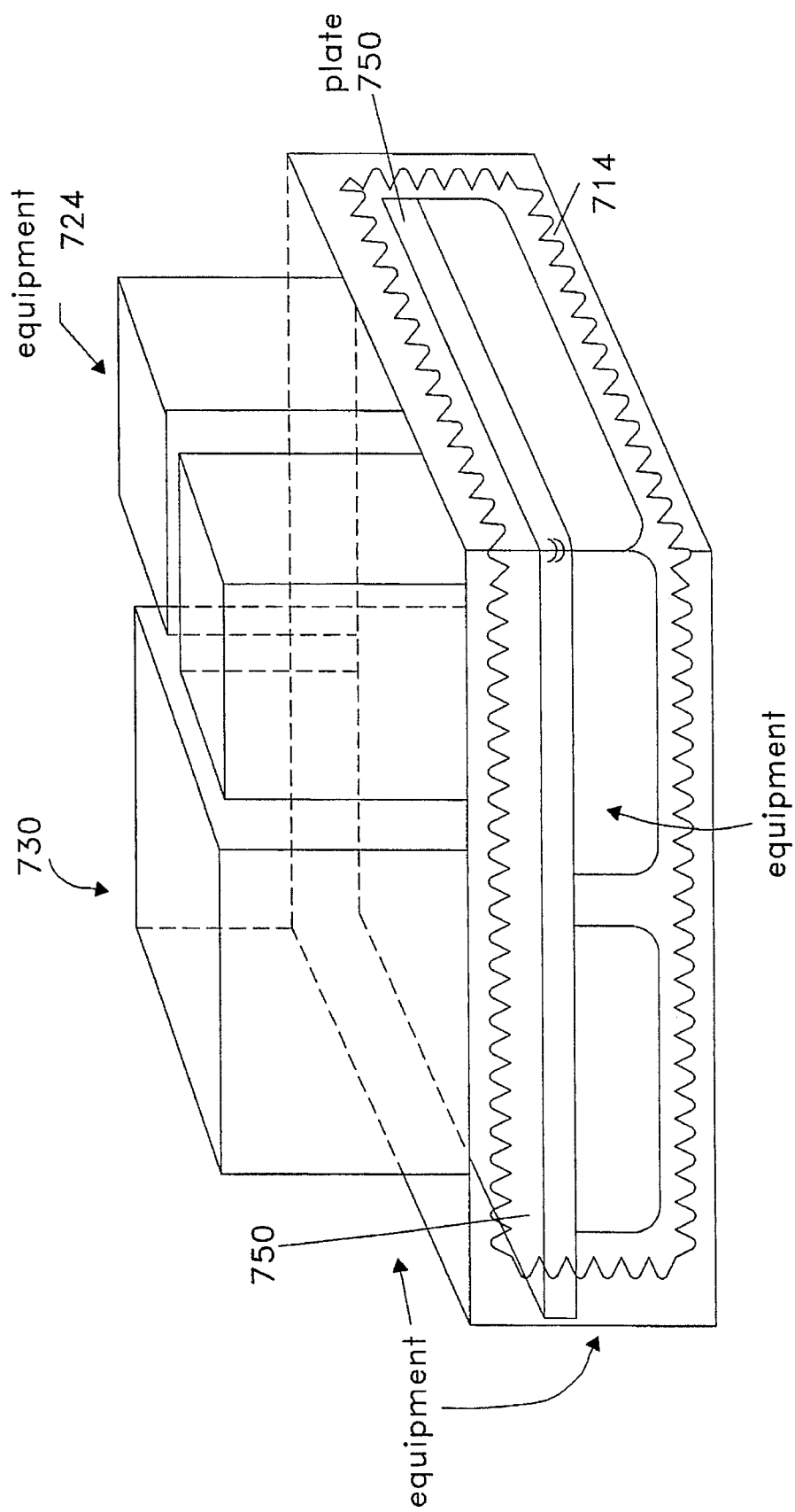

FIG. 7A shows a suitcase or housing 700 with a lid 710 and a bottom portion 714 according to one embodiment of the invention and FIG. 7B shows housing 700 with lid 710 removed. Referring to those figures, housing 700 has a handle 720 which can be used to carry housing 700 from one location to another. FIG. 7B shows equipment or components 724 of communications system 730 housed in housing 700. Communications system 730 can be transmission system 410 or receiving system 420 in FIG. 3A, high speed data line receiving system 510 in FIG. 4A or either first teleconference station 610F or second teleconference station 610S of FIG. 6A.

Bottom portion 714 of housing 700 has sides 736. Each of these sides 736 of bottom portion 714 of housing 700 has a holding ledge (see, e.g., FIG. 8B) welded thereto. A plate 750 rests on all four sides of the holding ledge and all components or equipment 724 is either directly or indirectly attached to plate 750.

Figure 8A:
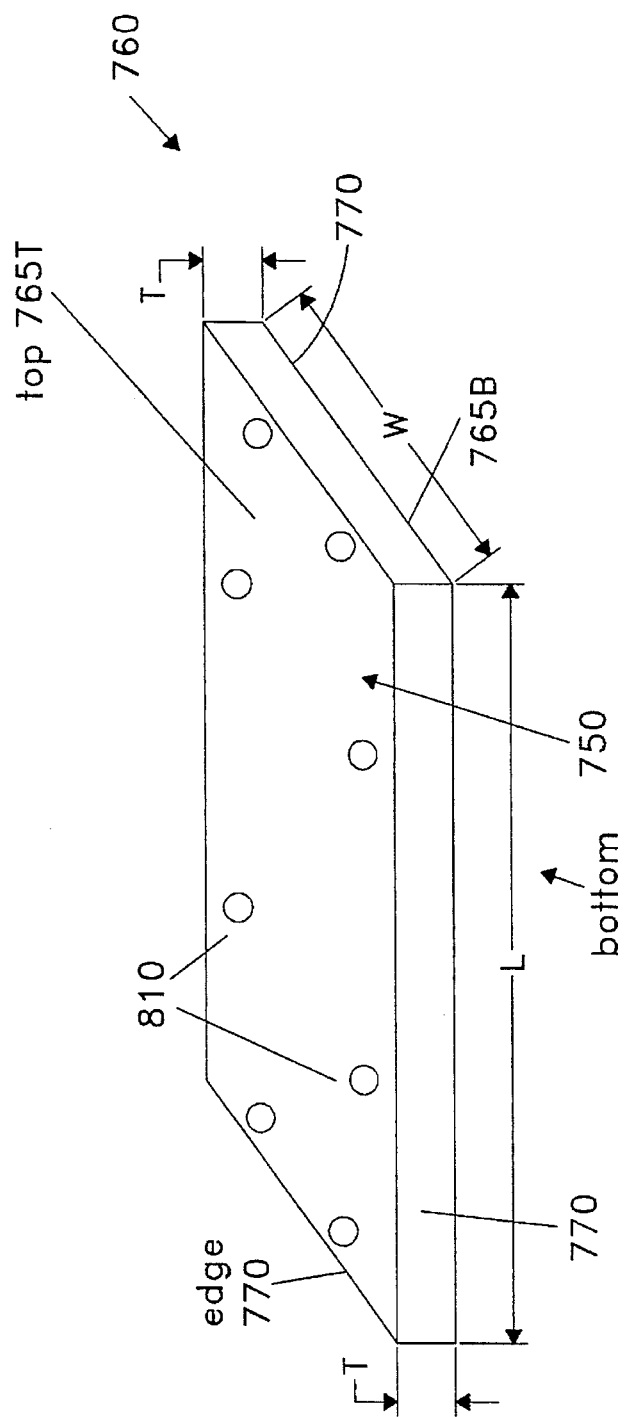
FIG. 8A shows a plate and FIG. 8B shows the bottom portion of the housing as viewed from above with the plate resting on a ledge.
Figure 8B:
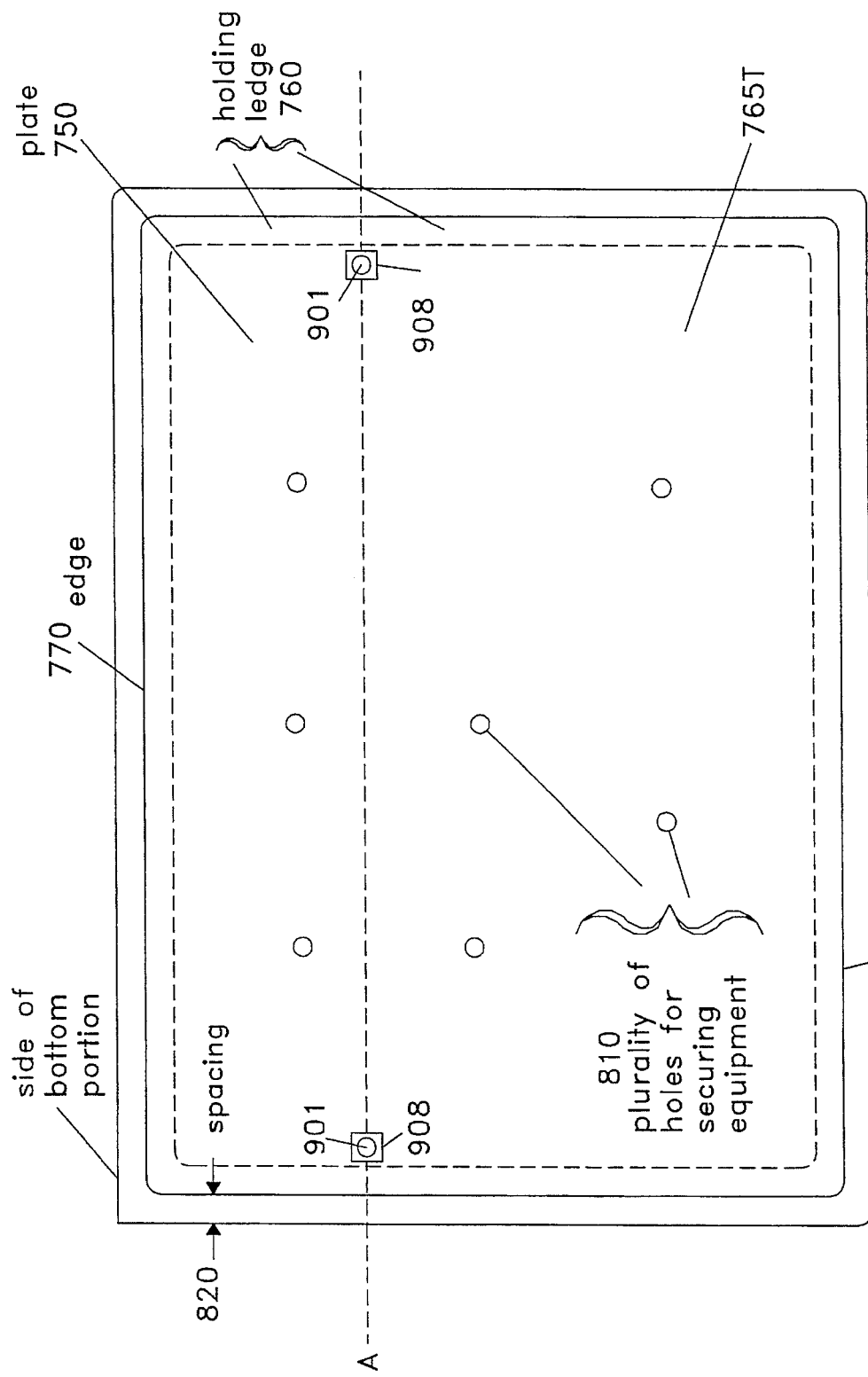

FIG. 8A shows plate 750 and FIG. 8B shows bottom portion 714 as viewed from above with plate 750 resting on ledge 760. Plate 750 has a top 765T and a bottom 765B with edges 770. Plate 760 also has holes 810 which make it possible to secure equipment 724 onto plate 750. Referring to FIG. 8B, plate 750 fits within bottom portion 714. In particular, a spacing 820 of approximately a few millimeters to over one inch exists between the interior of sides 736 of bottom portion 714 and edges 770 of plate 750. A part of holding ledge 760 is shown with dashed lines because plate 750 is resting on top of holding ledge 760.

Figure 9:
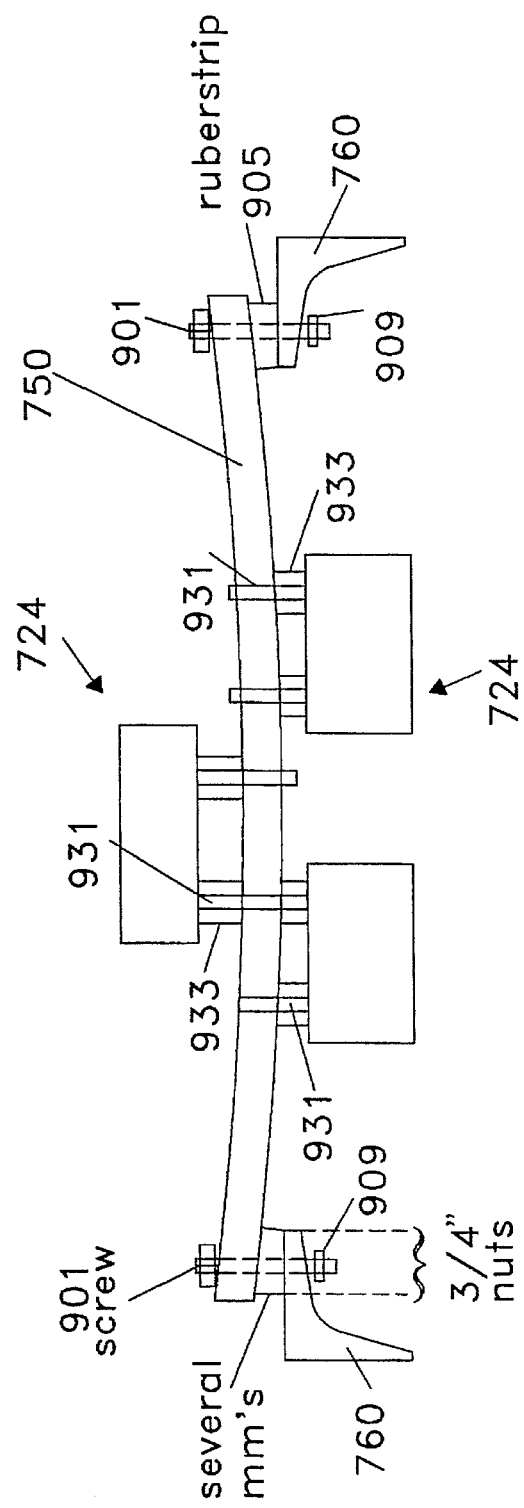
FIG. 9 shows a view along axis A of FIG. 8B with portable integrated communications equipment attached thereto.

Plate 750 can be made of any material which when cut to length L width W and thickness T is somewhat flexible. However, it is desirable that plate 750 slightly bend due to the weight of equipment 724, as shown in FIG. 9. To achieve this, plate 750 can be made of aluminum 50/51 approximately 30 to 100 mils thick and preferably 70 mils thick.

In particular, FIG. 9 shows a view along axis A of FIG. 8B with equipment 724 attached thereto. Note that although holding ledge 760 appears as separate pieces in FIG. 9, it is actually one ledge that runs along all four sides 736 of bottom portion 714, as shown in FIG. 7A. FIG. 9 further shows screws 901 which run through plate 750 and an additional rubber strip 905 which rests atop ledge 760. Plate 750 has slots 908 (see FIG. 8B) through which screws 901 pass, thereby allowing plate 750 to flex under the weight of equipment 724. Screws 901 are secured on the underside of holding ledge 760 by nuts 909. Slots 908 are approximately a few millimeters to over a centimeter in length. Rubber strip 905 is approximately a few millimeters to over ¾ inches in width and about a few millimeters thick up to over about 1 centimeter thick and can be made of a compressible material such as Neoprene.

Figure 10:
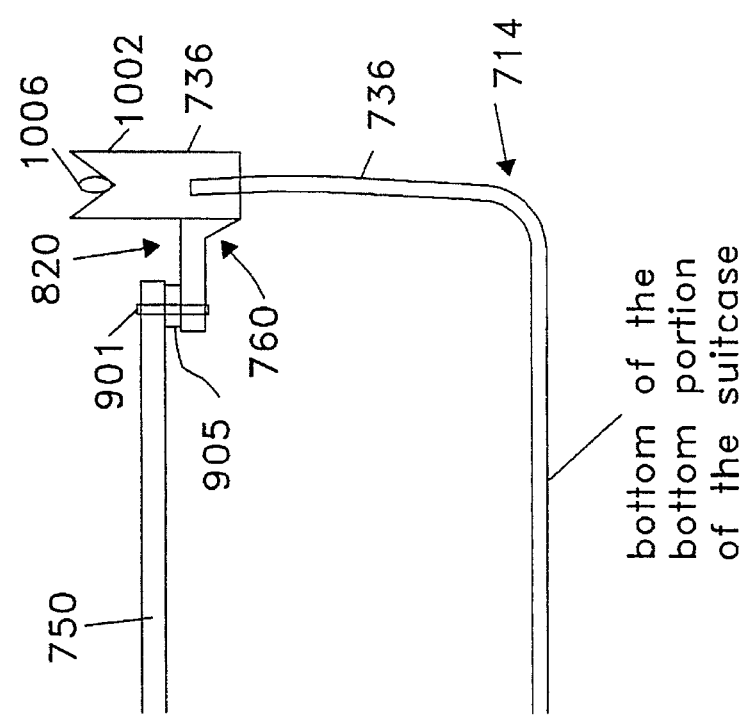
FIG. 10 shows a close-up view of the ledge together with the bottom portion of the housing.

FIG. 10 shows a close-up view of ledge 760 together with bottom portion 714 of housing 700. Ledge 760 is welded to side 736 and in particular to a metallic rim 736R of lid 710. FIG. 10 also shows a close-up view of spacing 820 discussed with reference to FIG. 8B. In addition, FIG. 10 shows a side view of an O-ring acceptor 1002 which part of rim 736R and runs along all four sides 736 of bottom portion 714. An O-ring 1006 rests within O-ring acceptor 1002 all the way around the top of bottom portion 714. O-ring 1006 together with O-ring acceptor 1002 help provide a moisture proof seal.

Figure 11:
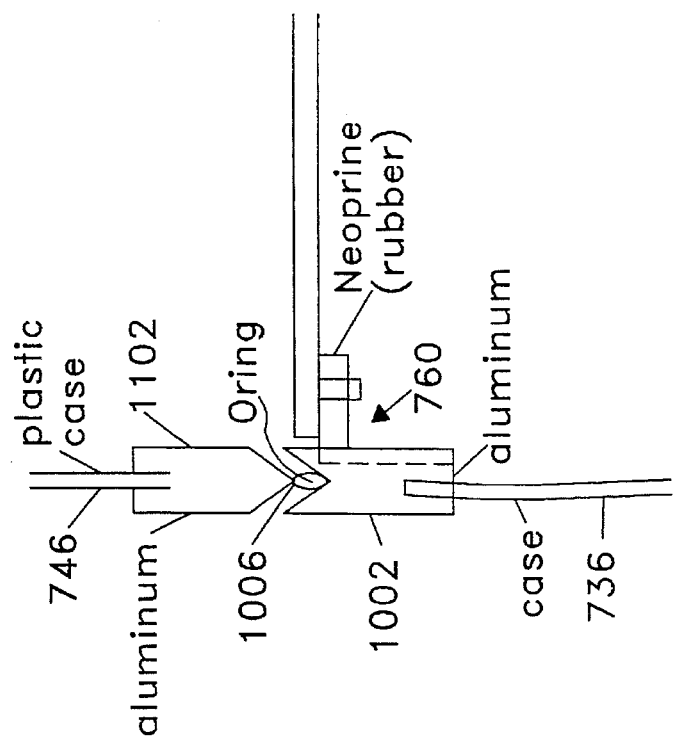
FIG. 11 shows a close-up view of how the lid rests on the bottom portion of the housing.

FIG. 11 shows a close-up view of how lid 710 rests on bottom portion 714 of housing 700. Lid 710 also has sides 746 that correspond to sides 736 of bottom portion 714. Side 746 of lid 710 has an O-ring acceptor matching piece 1102 which meets O-ring 1006 and conforms to the shape of O-ring acceptor 1002. As can be seen, when lid 710 is closed, O-ring acceptor matching piece 1102 and O-ring acceptor 1002 form a moisture tight seal with O-ring 1006. O-ring acceptor 1002 and O-ring acceptor matching piece 1102 can be made of a metal such as aluminum.

FIG. 12A shows a basket frame 1202 which is attached to the underside of plate 750 at locations 1208. Although bottom portion 714 is not shown in 12A, frame 1202 does not come into contact with bottom portion 714. That is, spacing 820 (FIG. 8B) exists between sides 736 of bottom portion 714 and frame 1202. Frame 1202 has corner supports 1214, bottom supports 1218 and top supports 1222. Only top supports 1222 are secured to plate 750. Four perforated side panels 1232 as well as a perforated bottom panel 1234 can slide into frame 1202. This makes it convenient to service components by replacing entire panels of components by merely sliding out the panel with a defect and sliding in a new panel and sending the damaged panel back to be serviced.

Side panels 1232 and bottom panel 1234 can be aluminum plates and panel holes 1238 can be used to secure components 1240 using screws. Components 1240 are part of equipment 724. Rubber cushions 1246 provide additional shock absorbing capability between plate 750 and frame 1202 and consequently between components 1240 and bottom portion 714 of housing 700.

Figure 12B:
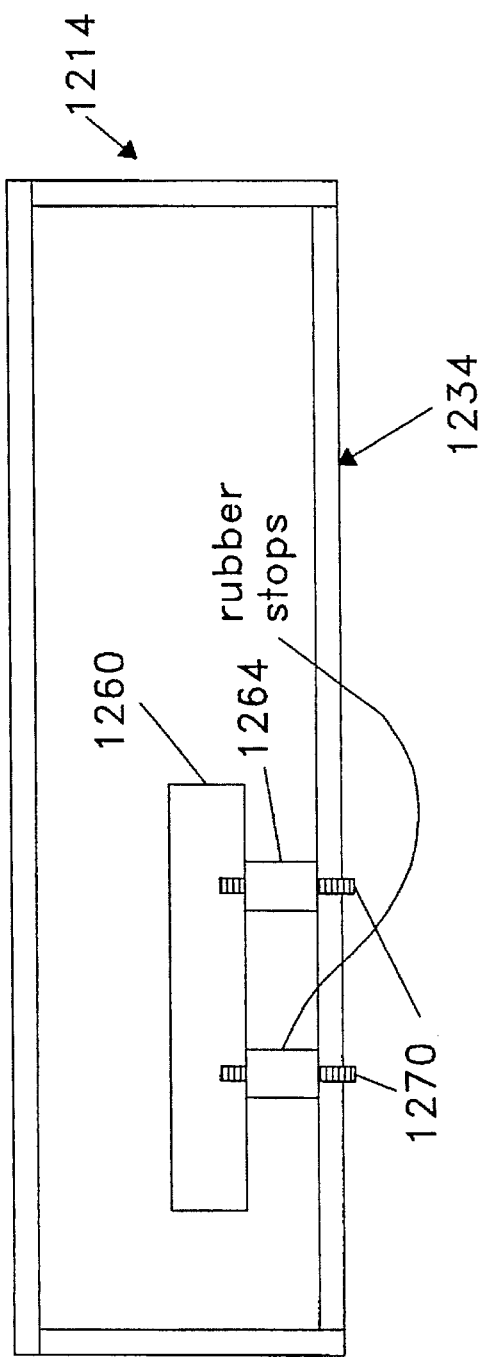

FIG. 12B shows frame 1202 as viewed from the side without side panels 1218. Components 1260 which require even further isolation from external forces to housing 700 are secured to perforated bottom panel 1234 with their own rubber cylinders or stops 1264. Component 1260 can be for example a hard disk drive which requires significant protection from external forces. Component 1260 is secured to perforated bottom panel 1234 with screws 1270 which pass through panel holes, component 1260 cushioned by rubber cylinders 1264. Consequently, components 1260 have the most isolation from shock or external forces incident on housing 700.

Summarizing the hierarchy of isolation from external forces to housing 700, components have a first level of isolation when they are attached directly to plate 750 which is isolated from lid 710 and from sides 736 and bottom portion 714 by spacing 820 and which rests on holding ledge 760 having cushioning rubber strip 905. A next level of isolation is achieved by attaching components to plate 750 with the addition of a rubber cylinder 933. An even higher level of isolation is achieved when components are attached to frame 1202 which itself is isolated from plate 750 via rubber cushions 1246. The highest level of isolation is achieved by attaching the most sensitive components (such as hard disk drives) to perforated bottom panel 1234 and isolating those components from bottom panel 1234 using rubber stops 1264.

Numerous additional modifications and variations of the present invention are possible in light of the above teachings. It is therefore to be understood that within the scope of the appended claims, the invention may be practiced otherwise as specifically claimed.

What is claimed is:

1. A housing for a portable integrated communications system, comprising:

a suitcase for housing said portable integrated communications system having a lid and a bottom portion, said bottom portion having a bottom and sides, said sides having a holding ledge attached thereto;

a plate having a top and a bottom and being capable of fitting within said bottom portion with a spacing between said sides of said suitcase and said plate, said plate being supported in said bottom portion of said suitcase by said holding ledge; and a basket frame attached to said plate for attaching said portable integrated communications system to said plate such that said portable integrated communications system does not contact said suitcase.

2. A portable integrated transmission system, comprising:

transmit interface means for transforming an analog signal into a digital signal;

transmit signal processing means for compressing said digital signal into a compressed asynchronous signal;

transmit signal converting means for converting said compressed asynchronous signal into a compressed synchronous signal;

microwave transmitting means for generating a microwave signal and modulating said microwave signal with said compressed synchronous signal to produce a modulated microwave signal and for transmitting said modulated microwave signal; and a housing for housing said transmit interface means, said transmit signal processing means, said transmit signal converting means and said microwave transmitting means, including:

a suitcase having a lid and a bottom portion, said bottom portion having a bottom and sides, said sides having a holding ledge attached thereto; and a plate having a top and a bottom and being capable of fitting within said bottom portion with a spacing between said sides of said suitcase and said plate, said plate being supported in said bottom portion of said suitcase by said holding ledge, a basket frame attached to said plate for attaching said transmit interface means, said transmit signal processing means, said transmit signal converting means and said microwave transmitting means to said plate, wherein said transmit interface means, said transmit signal processing means, said transmit signal converting means and said microwave transmitting means do not contact said suitcase.

3. A portable integrated receiving system, comprising:

microwave receiving means for receiving a modulated microwave signal which has been modulated with a compressed synchronous signal and for demodulation said modulated microwave signal into said compressed synchronous;

receive signal converting means for converting said compressed synchronous signal into a compressed asynchronous signal;

receive signal processing means for decompressing said compressed asynchronous signal into a digital signal and outputting said digital signal;

a housing for housing said microwave receiving means, said receive signal converting means, and said receive signal processing means, including:

a suitcase having a lid and a bottom portion, said bottom portion having a bottom and sides, said sides having a holding ledge attached thereto; and a plate having a top and a bottom and being capable of fitting within said bottom portion with a spacing between said sides of said suitcase and said plate, said plate being supported in said bottom portion of said suitcase by said holding ledge, a basket frame attached to said plate for attaching said microwave receiving means, said receive signal converting means and said receive signal processing means to said plate, wherein said microwave receiving means, said receive signal converting means and said receive signal processing means do not contact said suitcase.

4. A transmission and receiving system, comprising:

transmit interface means for transforming an analog signal into a digital signal;

transmit signal processing means coupled to said transmit interface means for compressing said digital signal into a compressed asynchronous signal;

transmit signal converting means coupled to said transmit signal processing means for converting said compressed asynchronous signal into a compressed synchronous signal;

microwave transmitting means coupled to said transmit signal converting means for generating a microwave signal and demodulating said microwave signal with said compressed synchronous signal to produce a first modulated microwave signal and for transmitting said first modulated microwave signal;

microwave receiving means for receiving a second modulated microwave signal which has been modulated with said compressed synchronous signal and for demodulating said second modulated microwave signal yielding said compressed synchronous signal;

receive signal converting means coupled to said microwave receiving means for converting said compressed synchronous signal into said compressed asynchronous signal; and second signal processing means coupled to said receive signal converting means for decompressing said compressed asynchronous signal into said digital signal and outputting said digital signal; and a housing for housing said transmit interface means, said transmit signal processing means, said microwave transmitting means, said microwave receiving means, said receive signal converting means and said second signal processing means, said housing including:

a suitcase having a lid and a bottom portion, said bottom portion having a bottom and sides, said sides having a holding ledge attached thereto;

a plate having a top and a bottom and being capable of fitting within said bottom portion with a spacing between said sides of said suitcase and said plate being supported in said bottom portion of said suitcase by said holding ledge; and a basket frame attached to said plate for attaching said transmit interface means, said transmit signal processing means, said microwave transmitting means, said microwave receiving means, said receive signal converting means and said second signal processing means to said plate such that said transmit interface means, said transmit signal processing means, said microwave transmitting means, said microwave receiving means, said receive signal converting means and said second signal processing means do not contact said suitcase.

5. The housing as claimed in claim 1, wherein said plate is shaped to provide at least ¾ of an inch between said sides of said suitcase and said edges of said plate.

6. The housing as claimed in claim 1, wherein said holding ledge is comprised of metal.

7. The housing as claimed in claim 1, wherein said plate is flexible.

8. The housing as claimed in claim 1, wherein said housing is comprised of plastic.

9. The housing as claimed in claim 1, wherein said plate has a plurality of holes for securing said system thereto.

10. The housing as claimed in claim 1, wherein said basket frame further comprises panels fitted in said basket frame.

11. The portable integrated transmission system as claimed in claim 2, wherein said basket frame further comprises panels fitted in said basket frame.

12. The portable integrated receiving system as claimed in claim 3, wherein said basket frame further comprises panels fitted in said basket frame.

13. The transmission and receiving system as claimed in claim 4, wherein said basket frame further comprises panels fitted in said basket frame.

14. The housing as claimed in claim 1, further comprising a rubber strip sandwiched between said holding ledge and said plate.

15. The housing as claimed in claim 14, wherein cushions are inserted between said basket frame and said plate.

16. The housing as claimed in claim 15, wherein perforated aluminum panels are fitted in said basket frame.

17. The housing as claimed in claim 16, wherein components of said communications system are attached to said perforated aluminum panels.

18. The housing as claimed in claim 16, wherein one of said perforated aluminum panels is a bottom panel and particularly sensitive components of said communications system are isolated from said bottom panel with rubber cylinders.

* * * * *